US012711913B2

(12) United States Patent
Park et al.

(10) Patent No.: US 12,711,913 B2
(45) Date of Patent: Aug. 18, 2026

(54) DISPLAY DEVICE HAVING A CAPACITOR INCLUDING A CAPACITOR ELECTRODE INTEGRALLY FORMED WITH A GATE ELECTRODE OF A TRANSISTOR

(71) Applicant: Samsung Display Co., Ltd., Yongin-si (KR)

(72) Inventors: Do Yeong Park, Yongin-si (KR); Woo Gun Kang, Yongin-si (KR); Dong Woo Kim, Yongin-si (KR); Yeon Kyung Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/473,926

(22) Filed: Sep. 25, 2023

(65) Prior Publication Data

US 2024/0144883 A1 May 2, 2024

(30) Foreign Application Priority Data

Oct. 26, 2022 (KR) ........................ 10-2022-0139454

(51) Int. Cl.

*G09G 3/3233* (2016.01)
*G09G 3/32* (2016.01)
*G09G 3/3291* (2016.01)

(52) U.S. Cl.

CPC ............. *G09G 3/3233* (2013.01); *G09G 3/32* (2013.01); *G09G 3/3291* (2013.01); *G09G 2310/0275* (2013.01); *G09G 2320/0209* (2013.01)

(58) Field of Classification Search

None
See application file for complete search history.

(56) References Cited

U.S. PATENT DOCUMENTS

| | | | | |
|---|---|---|---|---|
| 10,964,264 | B1 * | 3/2021 | Kim | G09G 3/3291 |
| 2018/0114823 | A1 * | 4/2018 | Lee | G09G 3/3233 |
| 2021/0249499 | A1 * | 8/2021 | Jeon | H10D 86/0231 |
| 2021/0320162 | A1 * | 10/2021 | Jeon | H10D 86/60 |
| 2022/0208804 | A1 * | 6/2022 | Jang | H01L 25/0753 |
| 2022/0319422 | A1 * | 10/2022 | Li | G09G 3/2007 |
| 2023/0138001 | A1 * | 5/2023 | Hao | H10K 59/1213 345/206 |

FOREIGN PATENT DOCUMENTS

| | | | |
|---|---|---|---|
| KR | 2017-0141305 | A | 12/2017 |
| KR | 2018-0009014 | A | 1/2018 |
| KR | 2018-0011404 | A | 2/2018 |
| KR | 2021-0148539 | A | 12/2021 |

* cited by examiner

*Primary Examiner* — Donna V Bocar
(74) *Attorney, Agent, or Firm* — Womble Bond Dickinson (US) LLP

(57) ABSTRACT

A display device comprises a substrate, a first voltage line in a first metal layer on the substrate, a first transistor including a drain electrode in an active layer on the first metal layer and electrically connected to the first voltage line, an active region adjacent to the drain electrode, a source electrode adjacent to the active region, and a gate electrode in a second metal layer on the active layer, and a first capacitor including a first capacitor electrode integrally formed with the gate electrode of the first transistor and having a closed-loop shape, and a second capacitor electrode in the first metal layer and overlapping with the first capacitor electrode.

20 Claims, 13 Drawing Sheets

MTL1 : VL
ACTL : DE, ACT, SE
MTL2 : GE, ANE1
MTL3 : CE
MTL4 : RME1, RME2
MTL5 : CTE1, CTE2, CTE4, CTE5

DISPLAY DEVICE HAVING A CAPACITOR INCLUDING A CAPACITOR ELECTRODE INTEGRALLY FORMED WITH A GATE ELECTRODE OF A TRANSISTOR

CROSS-REFERENCED TO RELATED APPLICATION

This application claims priority to and the benefit of Korean Patent Application No. 10-2022-0139454 filed on Oct. 26, 2022, in the Korean Intellectual Property Office, the entire disclosure of which is incorporated by reference herein.

BACKGROUND

1. Field

The present disclosure relates to a display device.

2. Description of the Related Art

As the information-oriented society evolves, various demands for display devices are ever increasing. For example, display devices are being employed by a variety of electronic devices such as smart phones, digital cameras, laptop computers, navigation devices, and smart televisions. Display devices may be flat panel display devices such as a liquid-crystal display device, a field emission display device, and an organic light-emitting display device. Among such flat panel display devices, a light-emitting display device includes a light-emitting element that can emit light on its own, so that each of the pixels of the display panel can emit light by themselves. Accordingly, a light-emitting display device can display images without a backlight unit that supplies light to the display panel. A light-emitting element may be an organic light-emitting diode using an organic material as a fluorescent material or an inorganic light-emitting diode using an inorganic material as a fluorescent material.

SUMMARY

Aspects and features of embodiments of the present disclosure provide a display device that can prevent color crosstalk and improve the image quality by way of blocking a coupling capacitance that may occur in a first capacitor electrode or a second capacitor electrode of each of first to third pixels.

It should be noted that aspects and features of the present disclosure are not limited to the above-mentioned aspects and features; and other aspects and features of the present disclosure will be apparent to those skilled in the art from the following descriptions.

According to one or more embodiments of the present disclosure, a display device includes a substrate, a first voltage line in a first metal layer on the substrate, a first transistor including a drain electrode in an active layer on the first metal layer and electrically connected to the first voltage line, an active region adjacent to the drain electrode, a source electrode adjacent to the active region, and a gate electrode in a second metal layer on the active layer, and a first capacitor including a first capacitor electrode integrally formed with the gate electrode of the first transistor and having a closed-loop shape, and a second capacitor electrode in the first metal layer and overlapping with the first capacitor electrode.

The display device may further include a first connection electrode, wherein the first connection electrode is in a third metal layer on the second metal layer, the first connection electrode is connected to the source electrode of the first transistor through a first contact hole, and the first connection electrode is connected to the second capacitor electrode through a second contact hole.

The first capacitor electrode may surround the first contact hole.

The display device may further include a first data line in the first metal layer, and a second transistor including a drain electrode in the active layer and electrically connected to the first data line, an active region adjacent to the drain electrode, a source electrode adjacent to the active region, and a gate electrode in the second metal layer.

The display device may further include a second connection electrode, wherein the second connection electrode is in the third metal layer on the second metal layer, the second connection electrode is connected to the source electrode of the second transistor through a third contact hole, and the second connection electrode is connected to the first capacitor electrode through a fourth contact hole.

The second connection electrode may be on in a first direction of the source electrode of the first transistor. The first connection electrode may be located in a direction opposite to the first direction of the second connection electrode, in a second direction crossing the first direction of the second connection electrode, and in a direction opposite to the second direction of the second connection electrode.

The fourth contact hole may be located between the source electrode of the first transistor and the third contact hole.

The fourth contact hole may be located in a first direction of the source electrode of the first transistor, and the fourth contact hole may be located in a second direction crossing the first direction of the third contact hole.

The first capacitor electrode may include a first portion surrounding the first contact hole, a second portion protruding from the first portion in the first direction, and a third portion protruding from the first portion in the second direction crossing the first direction. The first portion and the third portion of the first capacitor electrode may overlap the second capacitor electrode.

The second portion of the first capacitor electrode may be connected to the second connection electrode through the fourth contact hole.

According to one or more embodiments of the present disclosure, a display device includes a first data line, a second data line, and a third data line extending in parallel on a substrate, a pixel circuit of a first pixel configured to receive a data voltage from the first data line, a pixel circuit of a second pixel configured to receive a data voltage from the second data line, a pixel circuit of a third pixel configured to receive a data voltage from the third data line and located between the pixel circuit of the first pixel and the pixel circuit of the second pixel, and a light-emitting element of the third pixel configured to receive a driving current from the pixel circuit of the third pixel. The pixel circuit of the third pixel includes a first transistor connected between a first voltage line and the light-emitting element of the third pixel, a first connection electrode electrically connecting a source electrode of the first transistor with the light-emitting element of the third pixel, a first capacitor including a first capacitor electrode integrally formed with a gate electrode of the first transistor and a second capacitor electrode connected to the first connection electrode, a second transistor electrically connecting the third data line with the first capacitor electrode, and a second connection electrode electrically connecting the first capacitor electrode with a source electrode of the second transistor. The first connection electrode is between the pixel circuit of the first pixel and the second connection electrode, and the first connection electrode is between the pixel circuit of the second pixel and the second connection electrode.

The second transistor of the third pixel may be on a first side of the second connection electrode. The first connection electrode may surround the second connection electrode except for the first side of the second connection electrode.

The display device may further include a light-emitting element of the first pixel configured to receive a driving current from the pixel circuit of the first pixel. The pixel circuit of the first pixel may include a first transistor connected between the first voltage line and the light-emitting element of the first pixel, a third connection electrode electrically connecting the source electrode of the first transistor with the light-emitting element of the first pixel, a first capacitor including a first capacitor electrode integrally formed with the gate electrode of the first transistor and a second capacitor electrode connected to the third connection electrode, a second transistor electrically connecting the first data line with the first capacitor electrode, and a fourth connection electrode electrically connecting the first capacitor electrode with the source electrode of the second transistor.

The first capacitor electrode of the third pixel may have a closed-loop shape. The first capacitor electrode of the first pixel may have a shape in which a second side different from the first side is open.

The first capacitor of the first pixel may be located between a fourth connection electrode and the pixel circuit of the third pixel.

The display device may further include a light-emitting element of the second pixel configured to receive a driving current from the pixel circuit of the first pixel. The pixel circuit of the second pixel may include a first transistor connected between the first voltage line and the light-emitting element of the second pixel, a fifth connection electrode electrically connecting the source electrode of the first transistor with the light-emitting element of the second pixel, a first capacitor including a first capacitor electrode integrally formed with the gate electrode of the first transistor and a second capacitor electrode connected to the fifth connection electrode, a second transistor electrically connecting the second data line with the first capacitor electrode, and a sixth connection electrode electrically connecting the first capacitor electrode with the source electrode of the second transistor.

The first capacitor electrode of the third pixel may have a closed-loop shape. The first capacitor electrode of the first pixel may have a shape in which a second side different from the first side is open, and the first capacitor electrode of the second pixel may have a shape in which a third side opposite to the second side is open.

The first capacitor electrode of the third pixel may have a closed-loop shape, and the second connection electrode may overlap with a part of the closed-loop shape.

The first capacitor electrode of the third pixel may include a first portion having a closed-loop shape, a second portion protruding from a first side of the first portion, and a third portion protruding from a second side different from the first side of the first portion. The first portion and the third portion may overlap with the second capacitor electrode of the third pixel.

The second connection electrode may overlap with the second portion of the first capacitor electrode of the third pixel.

According to exemplary embodiments of the present disclosure, a pixel circuit of a third pixel between pixel circuits of first and second pixels includes a first capacitor electrode having a closed-loop shape, so that a coupling capacitance which may occur in a first capacitor electrode or a second capacitor electrode can be blocked. As a result, it is possible to prevent color crosstalk and improve image quality.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION

Figure 1:
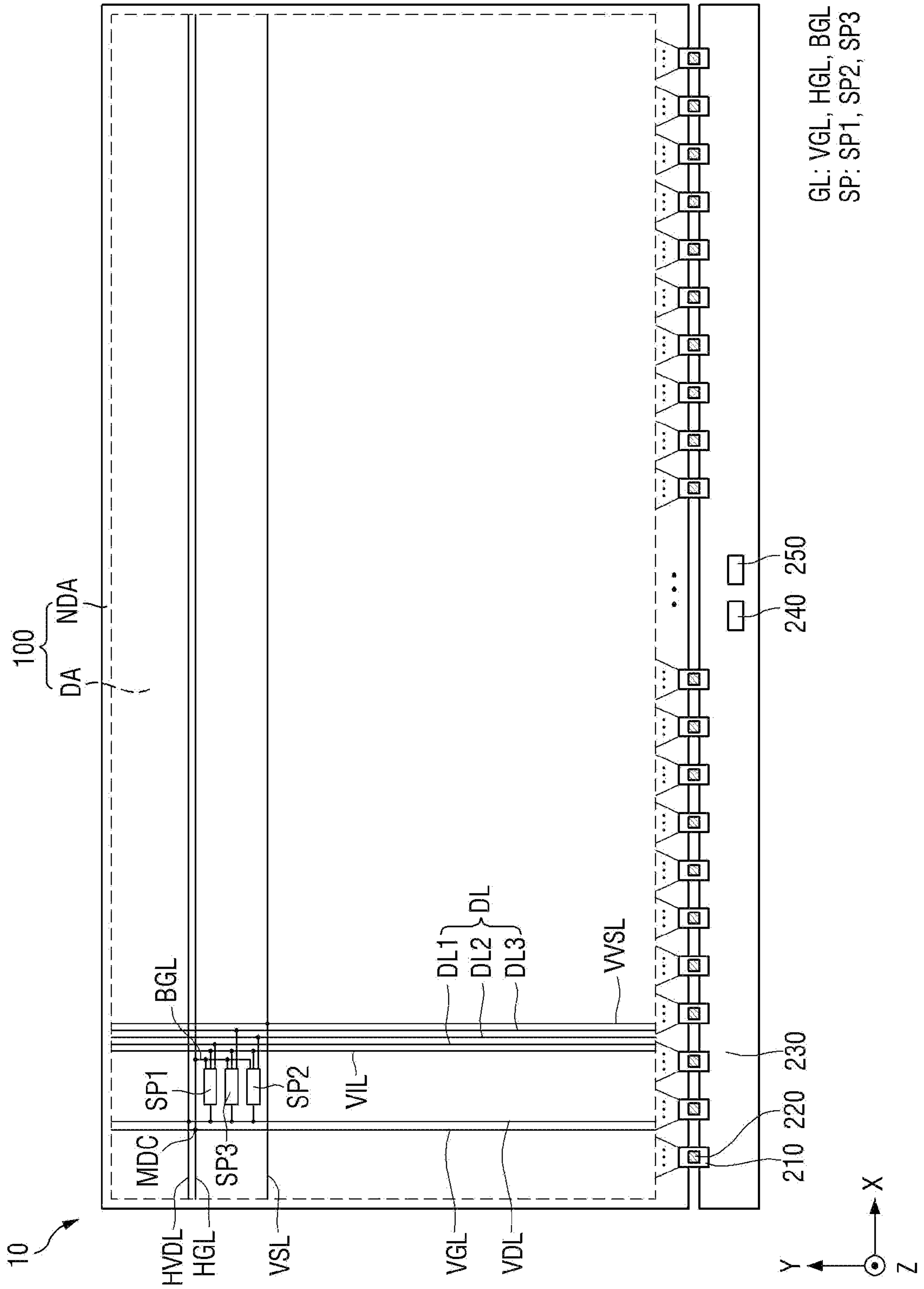
FIG. 1 is a plan view showing a display device according to one or more embodiments of the present disclosure.

The present disclosure will now be described more fully hereinafter with reference to the accompanying drawings, in which one or more embodiments are shown. This disclosure may, however, be embodied in different forms and should not be construed as limited to the embodiments set forth herein. Rather, these embodiments are provided so that the present disclosure will be thorough and complete, and will fully convey the scope of the present disclosure to those skilled in the art.

In the drawings, sizes, thicknesses, ratios, and dimensions of the elements may be exaggerated for ease of description and for clarity. Like numbers and/or reference characters in the drawings refer to like elements throughout.

In the following description, for the purposes of explanation, numerous specific details are set forth in order to provide a thorough understanding of various embodiments or implementations of the present disclosure. As used herein "embodiments" and "implementations" are interchangeable words that are non-limiting examples of devices or methods employing one or more of the embodiments disclosed herein. It is apparent, however, that various embodiments may be practiced without these specific details or with one or more equivalent arrangements. In other instances, structures and devices are shown in block diagram form in order to avoid unnecessarily obscuring various embodiments. Further, various embodiments may be different, but do not have to be exclusive nor limit the present disclosure. For example, specific shapes, configurations, and characteristics of an embodiment may be used or implemented in other embodiments without departing from the spirit and scope of the present disclosure.

Unless otherwise specified, the illustrated embodiments are to be understood as providing features of varying detail of some ways in which the present disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the spirit and scope of the present disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Further, in the accompanying drawings, the size and relative sizes of elements may be exaggerated for clarity and/or descriptive purposes. In case that an embodiment may be implemented differently, a specific process order may be performed differently from the described order. For example, two consecutively described processes may be performed substantially at the same time or performed in an order opposite to the described order. Also, like reference numerals denote like elements.

In case that an element, such as a layer, is referred to as being "on," "connected to," or "coupled to" another element or layer, it may be directly on, connected to, or coupled to the other element or layer or intervening elements or layers may be present. However, in case that an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Further, the X-axis, the Y-axis, and the Z-axis are not limited to three axes of a rectangular coordinate system, and thus the X-axis, Y-axis, and Z-axes, and may be interpreted in a broader sense. For example, the X-axis, the Y-axis, and the Z-axis may be perpendicular to one another, or may represent different directions that are not perpendicular to one another.

For the purposes of this disclosure including the specification and the claims, the phrase "at least one of" is intended to include the meaning of "at least one selected from the group of" for the purpose of its meaning and interpretation. For example, "at least one of A and B" may be understood to mean "A, B, or A and B.". As used herein, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or.". Although the terms "first," "second," and the like may be used herein to describe various types of elements, these elements should not be limited by these terms. These terms are only used to distinguish one element from another element. Thus, a first element discussed below could be termed a second element, and similarly, a second element may be referred to as a first element without departing from the teachings of the present disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

The terms "substantially," "about," and other similar terms, are used as terms of approximation and not as terms of degree, and, as such, are utilized to account for inherent deviations in measured, calculated, and/or provided values that would be recognized by one of ordinary skill in the art. Hence, "about" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

The terms "overlap" or "overlapped" mean that a first object may be above or below or to a side of a second object, and vice versa. The term "overlap" may include layer, stack, face or facing, extending over, covering, or partly covering or any other suitable term as would be appreciated and understood by those of ordinary skill in the art.

The phrase "in a plan view" means viewing the object from the top, and the phrase "in a schematic cross-sectional view" means viewing a cross-section of which the object is vertically cut from the side.

In case that an element is referred to as being "in contact" or "contacted" or the like to another element, the element may be in "electrical contact" or in "physical contact" with another element; or in "indirect contact" or in "direct contact" with another element.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature, and the shapes of these regions may not reflect actual shapes of regions of a device and, as such, are not necessarily intended to be limiting.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and/or the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of one or more embodiments may be physically separated into two or more interacting and discrete blocks, units, parts, and/or modules without departing from the spirit and scope of the present disclosure. Further, the blocks, units, parts, and/or modules of one or more embodiments may be physically combined into more complex blocks, units, parts, and/or modules without departing from the spirit and scope of the present disclosure.

Unless otherwise defined or implied herein, all terms (including technical and scientific terms) used herein have the same meaning as commonly understood by those skilled in the art to which the present disclosure pertains. It will be further understood that terms, such as those defined in commonly used dictionaries, should be interpreted as having a meaning that is consistent with their meaning in the context of the relevant art and the present disclosure, and will not be interpreted in an ideal or excessively formal sense unless clearly so defined herein.

Hereinafter, detailed embodiments of the present disclosure are described with reference to the accompanying drawings.

FIG. 1 is a plan view showing a display device according to one or more embodiments of the present disclosure.

As used herein, the terms "above," "top" and "upper surface" refer to the upper side of the display device, i.e., the side indicated by the arrow of the z-axis direction, whereas the terms "below," "bottom" and "lower surface" refer to the lower side of the display device, i.e., the opposite side in the z-axis direction. As used herein, the terms "left side," "right side," "upper side" and "lower side" indicate relative positions when the display device is viewed from the top. For example, the "left side" refers to the opposite side indicated by the arrow of the x-axis, the "right side" refers to the side indicated by the arrow of the x-axis, the "upper side" refers to the side indicated by the arrow of the y-axis, and the "lower side" refers to the opposite side indicated by the arrow of the y-axis.

Referring to FIG. 1, the display device 10 is for displaying a video or a still image. The display device 10 may be used as the display screen of portable electronic devices such as a mobile phone, a smart phone, a tablet PC, a smart watch, a watch phone, a mobile communications terminal, an electronic notebook, an electronic book, a portable multimedia player (PMP), a navigation device, and/or a ultra mobile PC (UMPC), as well as the display screen of various products such as a television, a laptop computer, a monitor, a billboard, and/or the Internet of Things (IoT).

The display device 10 may include a display panel 100, flexible films 210, display drivers 220, a circuit board 230, a timing controller 240 and a power supply 250.

The display panel 100 may have a rectangular shape when viewed from the top. For example, the display panel 100 may have a rectangular shape having longer sides in the first direction (x-axis direction) and shorter sides in the second direction (y-axis direction) when viewed from the top. The corners where the shorter sides in the first direction (x-axis direction) meet the longer sides in the second direction (y-axis direction) may be a right angle or may be rounded with a suitable curvature (e.g., a predetermined curvature). The shape of the display panel 100 when viewed from the top is not limited to a rectangular shape, but may be formed in a different polygonal shape, a circular shape, or an elliptical shape. For example, the display panel 100 may be formed flat, but the present disclosure is not limited thereto. For another example, the display panel 100 may be formed to bend with a suitable curvature (e.g., a predetermined curvature).

The display panel 100 may include a display area DA and a non-display area NDA along an edge or periphery of the display area DA.

The display area DA displays images therein and may be defined as a central area (or a central region) of the display panel 100. The display area DA may include pixels SP, gate lines GL, data lines DL, initialization voltage lines VIL, first voltage lines VDL, a horizontal voltage line HVDL, a vertical voltage line VVSL, and second voltage lines VSL. The pixels SP may be formed in pixel areas that are at crossings of the data lines DL and the gate lines GL, respectively. The pixels SP may include first to third pixels SP1, SP2, and SP3. Each of the first to third pixels SP1, SP2, and SP3 may be connected to one horizontal gate line HGL and one data line DL. Each of the first to third pixels SP1, SP2, and SP3 may be defined as the minimum unit area that emits light.

Each of the first to third pixels SP1, SP2, and SP3 may include an organic light-emitting diode (OLED) including an organic light-emitting layer, a quantum-dot light-emitting diode (LED) including a quantum-dot light-emitting layer, a micro LED, or an inorganic LED including an inorganic semiconductor and/or an inorganic light-emitting layer.

The first pixel SP1 may emit light of a first color or red light, the second pixel SP2 may emit light of a second color or green light, and the third pixel SP3 may emit light of a third color or blue light. The pixel circuit of the first pixel SP1, the pixel circuit of the third pixel SP3, and the pixel circuit of the second pixel SP2 may be arranged along the direction opposite to the second direction (y-axis direction). It should be understood, however, that the present disclosure is not limited thereto.

The gate lines GL may include vertical gate lines VGL, horizontal gate lines HGL, and auxiliary gate lines BGL.

The vertical gate lines VGL may be connected to the display drivers 220, may be extended in the second direction (y-axis direction) and may be spaced from one another in the first direction (x-axis direction). The vertical gate lines VGL may be arranged in parallel with the data lines DL. The horizontal gate lines HGL may be extended in the first direction (x-axis direction) and may be spaced from one another in the second direction (y-axis direction). The horizontal gate lines HGL may cross the vertical gate lines VGL. For example, one horizontal gate line HGL may be connected to one vertical gate line VGL from among the plurality of vertical gate lines VGL through a contact point MDC. At the contact point MDC, a portion of the horizontal gate line HGL may be inserted into a contact hole and may be in contact with the vertical gate line VGL. The auxiliary gate lines BGL may be extended from the horizontal gate lines HGL to supply gate signals to the first to third pixels SP1, SP2, and SP3.

The data lines DL may be extended in the second direction (y-axis direction) and may be spaced from each other in the first direction (x-axis direction). The data lines DL may include first to third data lines DL1, DL2, and DL3. The first to third data lines DL1, DL2, and DL3 may supply data voltage to each of the first to third pixels SP1, SP2, and SP3.

The initialization voltage lines VIL may be extended in the second direction (y-axis direction) and may be spaced from each other in the first direction (x-axis direction). The initialization voltage lines VIL may supply the initialization voltage received from the display driver 220 to the pixel circuit of each of the first to third pixels SP1, SP2 and SP3. The initialization voltage line VIL may receive a sensing signal from the pixel circuit of each of the first to third pixels SP1, SP2 and SP3 and may supply the sensing signal to the display driver 220.

The first voltage lines VDL may be extended in the second direction (y-axis direction) and may be spaced from one another in the first direction (x-axis direction). The first voltage line VDL may supply a driving voltage or a high-level voltage received from the power supply 250 to the first to third pixels SP1, SP2, and SP3.

The horizontal voltage line HVDL may be extended in the first direction (x-axis direction) and may be spaced from one another in the second direction (x-axis direction). The horizontal voltage line HVDL may be connected to the first voltage lines VDL. The horizontal voltage line HVDL may receive the driving voltage or high-level voltage from the first voltage lines VDL.

The vertical voltage line VVSL may be extended in the second direction (y-axis direction) and may be spaced from each other in the first direction (x-axis direction). The vertical voltage line VVSL may be connected to the second voltage lines VSL. The vertical voltage line VVSL may supply the low-level voltage received from the power supply 250 to the second voltage lines VSL.

The second voltage lines VSL may be extended in the first direction (x-axis direction), and may be spaced from each other in the second direction (y-axis direction). The second voltage lines VSL may supply a low-level voltage to the first to third pixels SP1, SP2 and SP3.

The connection relationship of the pixels SP, the gate lines GL, the data lines DL, the initialization voltage lines VIL, the first voltage lines VDL and the second voltage lines VSL may be altered depending on the number and arrangement of the pixels SP.

The non-display area NDA may be defined as the remaining area of the display panel 100 except the display area DA. For example, the non-display area NDA may include fan-out lines connecting the vertical gate lines VGL, the data lines DL, the initialization voltage lines VIL, the first voltage lines VDL, and the vertical voltage line VVSL with the data drivers 220, and a pad area connected to the flexible films 210.

The input terminals disposed on one side of the flexible films 210 may be attached to the circuit board 230 via a film attaching process, and the output terminals provided on the other side of the flexible films 210 may be attached to the pad area via the film attaching process. For example, each of the flexible films 210 may be bent, like a tape carrier package and a chip on film. The flexible films 210 may be bent so that they are disposed under the display panel 100 to reduce the bezel area of the display device 10.

The display drivers 220 may be mounted on the flexible films 210, respectively. For example, the display drivers 220 may be implemented as integrated circuits (IC). The display drivers 220 may receive digital video data and a data control signal from the timing controller 240, and may convert the digital video data into an analog data voltage in response to the data control signal to send it to the data lines DL through the fan-out lines. The display drivers 220 may generate gate signals in response to a gate control signal supplied from the timing controller 240 and sequentially supply the gate signals to the vertical gate lines VGL in a suitable order (e.g., a predetermined order). Accordingly, the display drivers 220 may work as data drivers as well as gate drivers. Because the display device 10 includes the display drivers 220 disposed on the lower side of the non-display area NDA, sizes of the left, right and upper sides of the non-display area NDA can be reduced.

The circuit board 230 may support the timing controller 240 and the power supply 250, and may supply signals and voltages to the display drivers 220. For example, the circuit board 230 may supply a signal supplied from the timing controller 240 and supply voltages supplied from the power supply 250 to the data drivers 220 to drive the pixels to display images. To this end, signal lines and voltage lines may be disposed on the circuit board 230.

The timing controller 240 may be mounted on the circuit board 230 and may receive image data and a timing synchronization signal supplied from a display driving system or a graphic device through a user connector provided on the circuit board 230. The timing controller 240 may generate digital video data by coordinating the image data appropriately for the pixel arrangement structure in response to a timing synchronization signal, and may supply the generated digital video data to the display driver 220. The timing controller 240 may generate a data control signal and a gate control signal based on the timing synchronization signal. The timing controller 240 may control the supply timing of the data voltage of the display driver 220 based on the data control signal, and may control the supply timing of the gate signal of the display driver 220 based on the gate control signal.

The power supply 250 may be disposed on the circuit board 230 to apply a supply voltage to the display drivers 220 and the display panel 100. For example, the power supply 250 may generate a driving voltage or a high-level voltage to supply it to the first voltage lines VDL, may generate a low-level voltage to supply it to the vertical voltage line VVSL, and may generate an initialization voltage to supply it to the initialization voltage lines.

Figure 2:
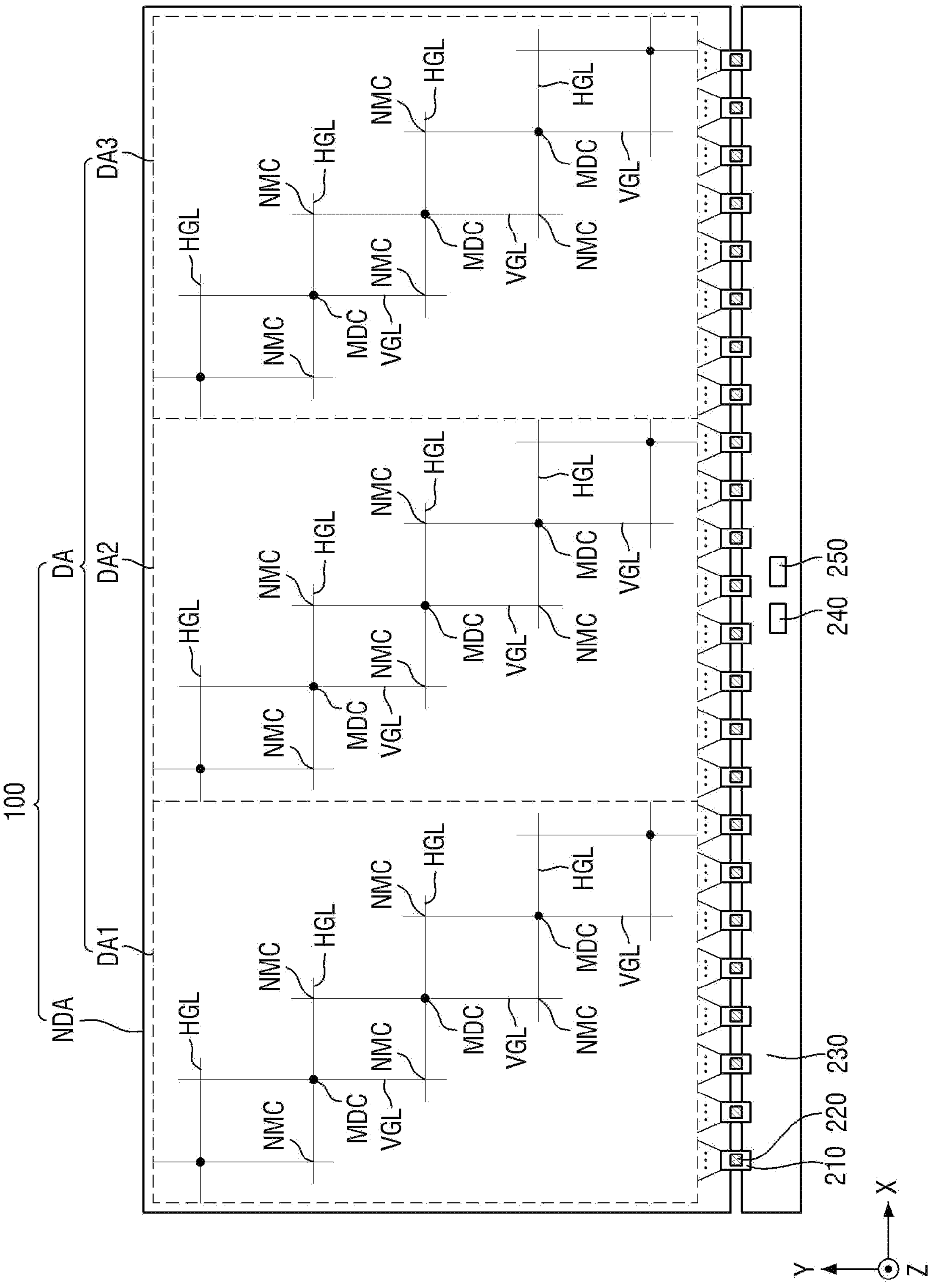
FIG. 2 is a plan view showing contact points of vertical gate lines and horizontal gate lines in a display device according to one or more embodiments.

FIG. 2 is a plan view showing contact points of vertical gate lines and horizontal gate lines in a display device according to one or more embodiments.

Referring to FIG. 2, the display area DA may include first to third display area DA1, DA2, and DA3.

The horizontal gate lines HGL may cross the vertical gate lines VGL, respectively. The horizontal gate lines HGL may cross the vertical gate lines VGL at the contact points MDC and non-contact points NMC. For example, one horizontal gate line HGL may be connected to one vertical gate line VGL from among the plurality of vertical gate lines VGL through a contact point MDC. One horizontal gate line HGL may be insulated from the other vertical gate lines VGL at the non-contact points NMC.

The contact points MDC of the first display area DA1 may be arranged on a line extended from the upper left end of the first display area DA1 to the lower right end of the first display area DA1. The contact points MDC of the second display area DA2 may be arranged on a line extended from the upper left end of the second display area DA2 to the lower right end of the second display area DA2. The contact points MDC of the third display area DA3 may be arranged on a line extended from the upper left end of the third display area DA3 to the lower right end of the third display area DA3. Accordingly, the contact points MDC may be arranged in a diagonal direction between the first direction (x-axis direction) and the second direction (y-axis direction) in each of the first to third display areas DA1, DA2, and DA3.

The display device 10 may include the display drivers 220 working as data drivers as well as gate drivers. Accordingly, the data lines DL may receive data voltages from the display drivers 220 disposed on the lower side of the non-display area NDA, and the vertical gate lines VGL may receive gate signals from the display drivers 220 disposed on the lower side of the non-display area NDA, so that the sizes of the left, right and upper sides of the non-display area NDA of the display device 10 can be reduced.

Figure 3:
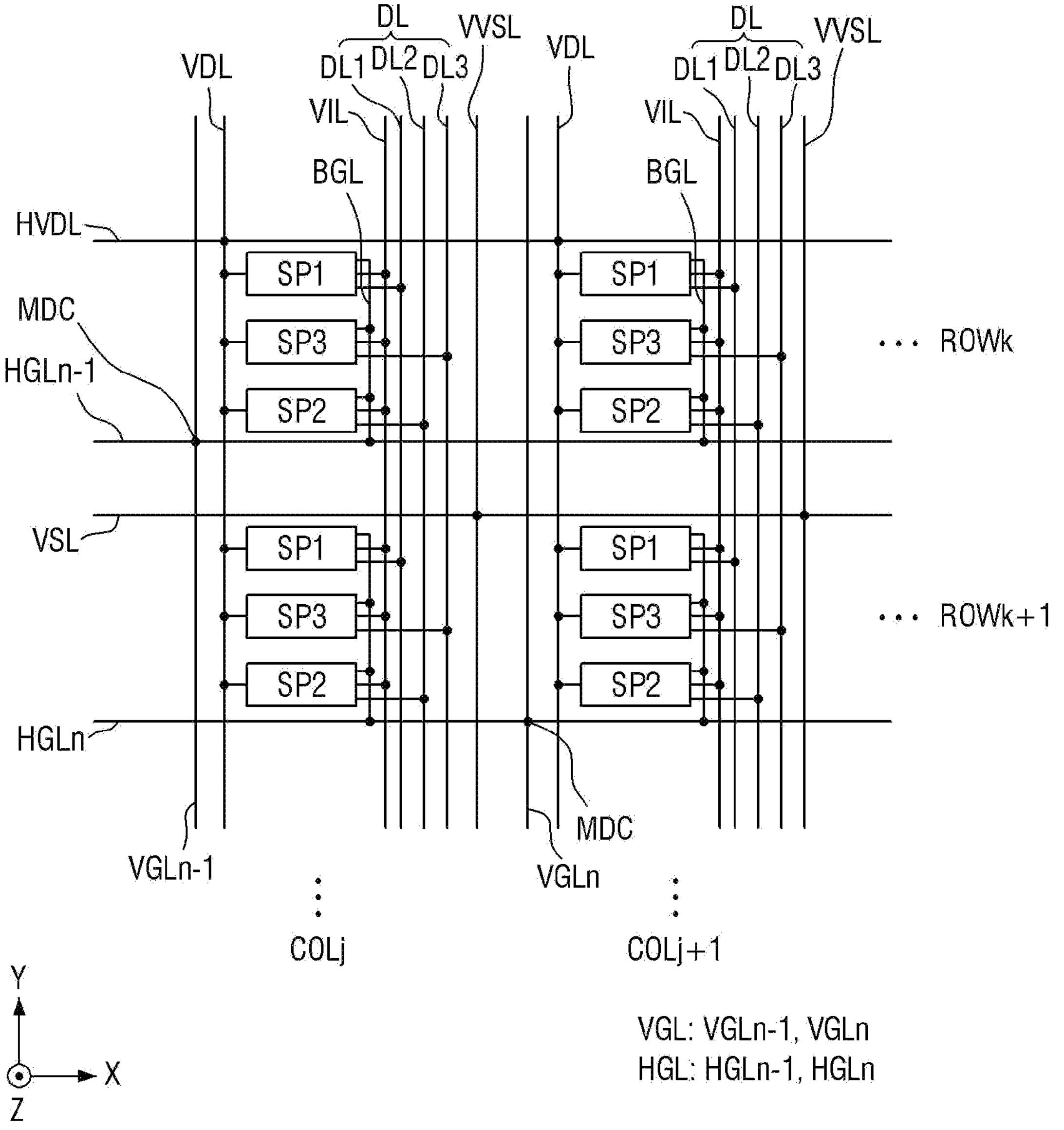
FIG. 3 is a view showing pixels and lines in a display device according to one or more embodiments.

FIG. 3 is a view showing pixels and lines in a display device according to one or more embodiments.

Referring to FIG. 3, a pixel SP may include first to third pixels SP1, SP2, and SP3. The pixel circuit of the first pixel SP1, the pixel circuit of the third pixel SP3, and the pixel circuit of the second pixel SP2 may be arranged along the direction opposite to the second direction (y-axis direction). It should be understood, however, that the present disclosure is not limited thereto.

Each of the first to third pixels SP1, SP2, and SP3 may be connected to the first voltage lines VDL, the initialization voltage lines VIL, the gate lines GL, and the data lines DL.

The first voltage lines VDL may be extended in the second direction (y-axis direction). The first voltage lines VDL may be disposed on the left side of the pixel circuits of the first to third pixels SP1, SP2, and SP3. The first voltage lines VDL may supply a driving voltage or a high-level voltage to transistors of each of the first to third pixels SP1, SP2, and SP3.

The horizontal voltage line HVDL may be extended in the first direction (x-axis direction). The horizontal voltage line HVDL may be disposed on the upper side of the pixel circuit of the first pixel SP1 disposed in the kth row ROWk, where k is a positive integer. The horizontal voltage line HVDL may be connected to the first voltage lines VDL. The horizontal voltage line HVDL may receive the driving voltage or high-level voltage from the first voltage lines VDL.

The initialization voltage line VIL may be extended in the second direction (y-axis direction). The initialization voltage line VIL may be disposed on the right side of the auxiliary gate line BGL. The initialization voltage line VIL may be disposed between the auxiliary gate line BGL and the data lines DL. The initialization voltage line VIL may supply the initialization voltage to the pixel circuit of each of the first to third pixels SP1, SP2, and SP3. The initialization voltage line VIL may receive a sensing signal from the pixel circuit of each of the first to third pixels SP1, SP2, and SP3 and may supply the sensing signal to the display drivers 220.

The gate lines GL may include vertical gate lines VGL, horizontal gate lines HGL, and auxiliary gate lines BGL.

The vertical gate lines VGL may be extended in the second direction (y-axis direction). At least one vertical gate line VGL may be disposed between adjacent pixels SP. The vertical gate lines VGL may be connected between the display drivers 220 and the horizontal gate lines HGL. The vertical gate lines VGL may cross the horizontal gate lines HGL. The vertical gate lines VGL may supply the gate signals received from the display drivers 220 to the horizontal gate lines HGL.

For example, the $(n-1)^{th}$ vertical gate line VGL(n−1) may be disposed on the left side of the pixels SP disposed in the $j^{th}$ column COLj, where n is an integer equal to or greater than two, and j is a positive integer. The $n^{th}$ vertical gate line VGLn may be disposed between the pixels SP disposed in the $j^{th}$ column COLj and the pixels SP disposed in the (j+1)th column COL(j+1). The $n^{th}$ vertical gate line VGLn may be disposed between the data lines DL connected to the pixels SP disposed in the $j^{th}$ column COLj and the first voltage line VDL connected to the pixels SP disposed in the $(j+1)^{th}$ column COL(j+1). The $(n-1)^{th}$ vertical gate line VGL(n−1) may be connected to the $(n-1)^{th}$ horizontal gate line HGL (n−1) through the contact point MDC and may be insulated from the other horizontal gate lines HGL. The $n^{th}$ vertical gate line VGLn may be connected to the $n^{th}$ horizontal gate line HGLn through the contact point MDC and may be insulated from the other horizontal gate lines HGL.

The horizontal gate lines HGL may be extended in the first direction (x-axis direction). The horizontal gate lines HGL may be disposed on the lower side of the pixel circuit of the second pixel SP2. The horizontal gate lines HGL may be connected between the vertical gate lines VGL and the auxiliary gate lines BGL. The horizontal gate line HGL may supply a gate signal received from the vertical gate line VGL to the auxiliary gate line BGL.

For example, the $(n-1)^{th}$ horizontal gate line HGL(n−1) may be disposed on the lower side of the pixel circuit of the second pixel SP2 disposed in the kth row ROWk. The $(n-1)^{th}$ horizontal gate line HGL(n−1) may be connected to the $(n-1)^{th}$ vertical gate line VGL(n−1) through the contact point MDC and may be insulated from the other vertical gate lines VGL. The $n^{th}$ horizontal gate line HGLn may be disposed on the lower side of the pixel circuit of the second pixel SP2 disposed in the $(k+1)^{th}$ row ROW(k+1). The $n^{th}$ horizontal gate line HGLn may be connected to the $n^{th}$ vertical gate line VGLn through the contact point MDC and may be insulated from the other vertical gate lines VGL.

The auxiliary gate lines BGL may be extended in the second direction (y-axis direction) from the horizontal gate lines HGL. The auxiliary gate lines BGL may be disposed on the right side of the pixel circuits of the first to third pixels SP1, SP2, and SP3. The auxiliary gate lines BGL may supply the gate signals received from the horizontal gate lines HGL to the pixel circuits of the first to third pixels SP1, SP2, and SP3.

The data lines DL may be extended in the second direction (y-axis direction). The data lines DL may supply data voltages to the pixels SP. The data lines DL may include first to third data lines DL1, DL2, and DL3.

The first data line DL1 may be extended in the second direction (y-axis direction). The first data line DL1 may be disposed on the right side of the initialization voltage line VIL. The first data line DL1 may supply the data voltage received from the display driver 220 to the pixel circuit of the first pixel SP1.

The second data line DL2 may be extended in the second direction (y-axis direction). The second data line DL2 may be disposed on the right side of the first data line DL1. The second data line DL2 may supply the data voltage received from the display driver 220 to the pixel circuit of the second pixel SP2.

The third data line DL3 may be extended in the second direction (y-axis direction). The third data line DL3 may be disposed on the right side of the second data line DL2. The third data line DL3 may supply the data voltage received from the display driver 220 to the pixel circuit of the third pixel SP3.

The vertical voltage line VVSL may be extended in the second direction (y-axis direction). The vertical voltage line VVSL may be disposed on the right side of the third data line DL3. The vertical voltage line VVSL may be connected between the power supply 250 and the second voltage line VSL. The vertical voltage line VVSL may supply the low-level voltage supplied from the power supply 250 to the second voltage line VSL.

A second voltage line VSL may be extended in the first direction (x-axis direction). The second voltage line VSL may be disposed on the upper side of the pixel circuit of the first pixel SP1 disposed in the $(k+1)^{th}$ row ROW(k+1). The second voltage line VSL may supply the low-level voltage received from the vertical voltage line VVSL to the emission material layer of the first to third pixels SP1, SP2, and SP3.

Figure 4:
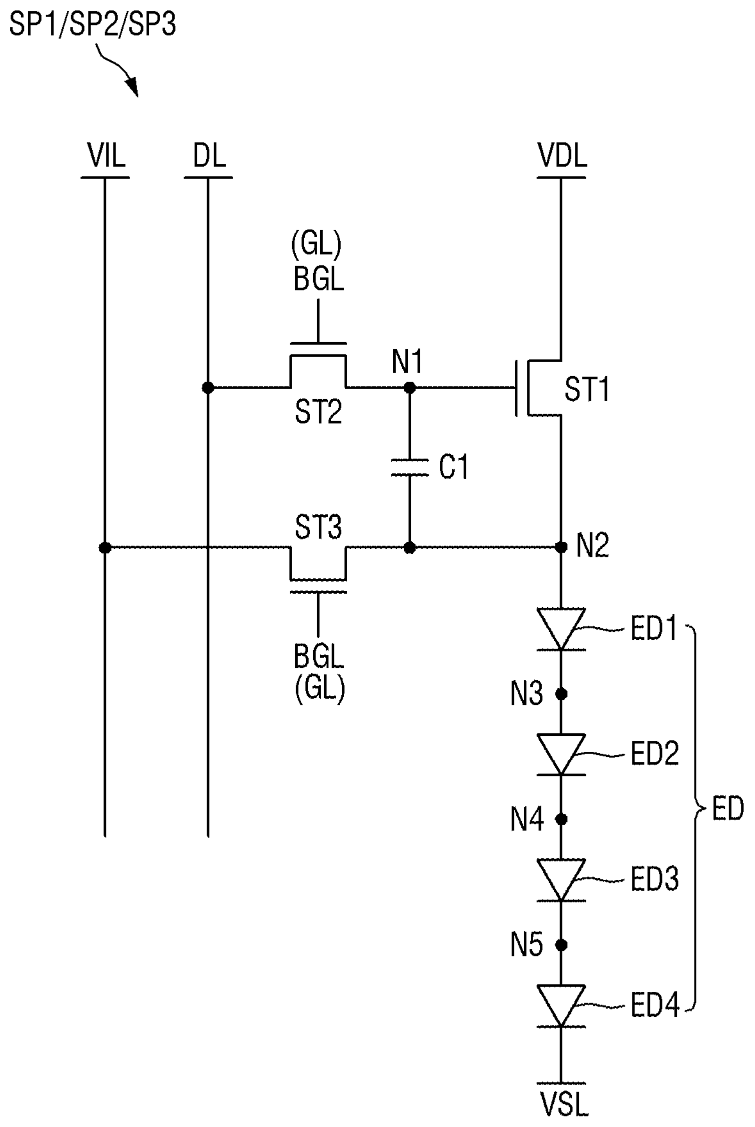
FIG. 4 is a circuit diagram showing a pixel of a display device according to one or more embodiments of the present disclosure.

FIG. 4 is a circuit diagram showing a pixel of a display device according to one or more embodiments of the present disclosure.

Referring to FIG. 4, each of the pixels SP may be connected to a first voltage line VDL, a data line DL, an initialization voltage line VIL, a gate line GL, and a second voltage line VSL.

Each of the first to third pixels SP1, SP2, and SP3 may include first to third transistors ST1, ST2, and ST3, a first capacitor C1, and a plurality of light emitting elements ED.

The first transistor ST1 may include a gate electrode, a drain electrode, and a source electrode. The gate electrode of the first transistor ST1 may be connected to a first node N1, the drain electrode thereof may be connected to the first voltage line VDL, and the source electrode thereof may be connected to a second node N2. The first transistor ST1 may control a drain-source current (or a driving current) based on a data voltage applied to the gate electrode of the first transistor ST1.

The light-emitting elements ED may include first to fourth light-emitting elements ED1, ED2, ED3, and ED4. The first to fourth light-emitting elements ED1, ED2, ED3 and ED4 may be connected in series. The first to fourth light-emitting elements ED1, ED2, ED3, and ED4 may receive the driving current to emit light. The amount or the brightness of the light emitted from the light-emitting elements ED may be proportional to the magnitude of the driving current. The light-emitting element ED may be an organic light-emitting diode (OLED) including an organic light-emitting layer, a quantum-dot LED including a quantum-dot light-emitting layer, a micro LED, or an inorganic LED including an inorganic semiconductor and/or an inorganic light-emitting layer.

A first electrode of the first light-emitting element ED1 may be connected to the second node N2, and a second electrode of the first light-emitting element ED1 may be connected to a third node N3. The first electrode of the first light-emitting element ED1 may be connected to the source electrode of the first transistor ST1, the drain electrode of the third transistor ST3, and the second electrode of the first capacitor C1 through the second node N2. The second electrode of the first light-emitting element ED1 may be connected to the first electrode of the second light-emitting element ED2 through the third node N3.

A first electrode of the second light-emitting element ED2 may be connected to the third node N3, and a second electrode of the second light-emitting element ED2 may be connected to a fourth node N4. A first electrode of the third light-emitting element ED3 may be connected to the fourth node N4, and a second electrode of the third light-emitting element ED3 may be connected to a fifth node N5. A first electrode of the fourth light-emitting element ED4 may be connected to the fifth node N5, and a second electrode of the fourth light-emitting element ED4 may be connected to the second voltage line VSL.

The second transistor ST2 may be turned on by a gate signal from the gate line GL to electrically connect the data line DL with the first node N1, which is the gate electrode of the first transistor ST1. The second transistor ST2 may be turned on in response to the gate signal to apply data voltage to the first node N1. The gate electrode of the second transistor ST2 may be connected to the gate line GL, the drain electrode may be connected to the data line DL, and the source electrode may be connected to the first node N1. The source electrode of the second transistor ST2 may be connected to the gate electrode of the first transistor ST1 and the first capacitor electrode of the first capacitor C1 through the first node N1.

The third transistor ST3 may be turned on by a gate signal of a gate line GL to electrically connect the initialization voltage line VIL with the second node N2, which is the source electrode of the first transistor ST1. The third transistor ST3 may be turned on in response to the gate signal to apply the initialization voltage to the second node N2. The third transistor ST3 may be turned on in response to the gate signal to apply the sensing signal to the initialization voltage In VIL. The gate electrode of the third transistor ST3 may be connected to the gate line GL, the drain electrode may be connected to the second node N2, and the source electrode may be connected to the initialization voltage line VIL. The drain electrode of the third transistor ST3 may be connected to the source electrode of the first transistor ST1 through the second node N2, the second capacitor electrode of the first capacitor C1, and the first electrode of the first light-emitting element ED1.

Figure 5:
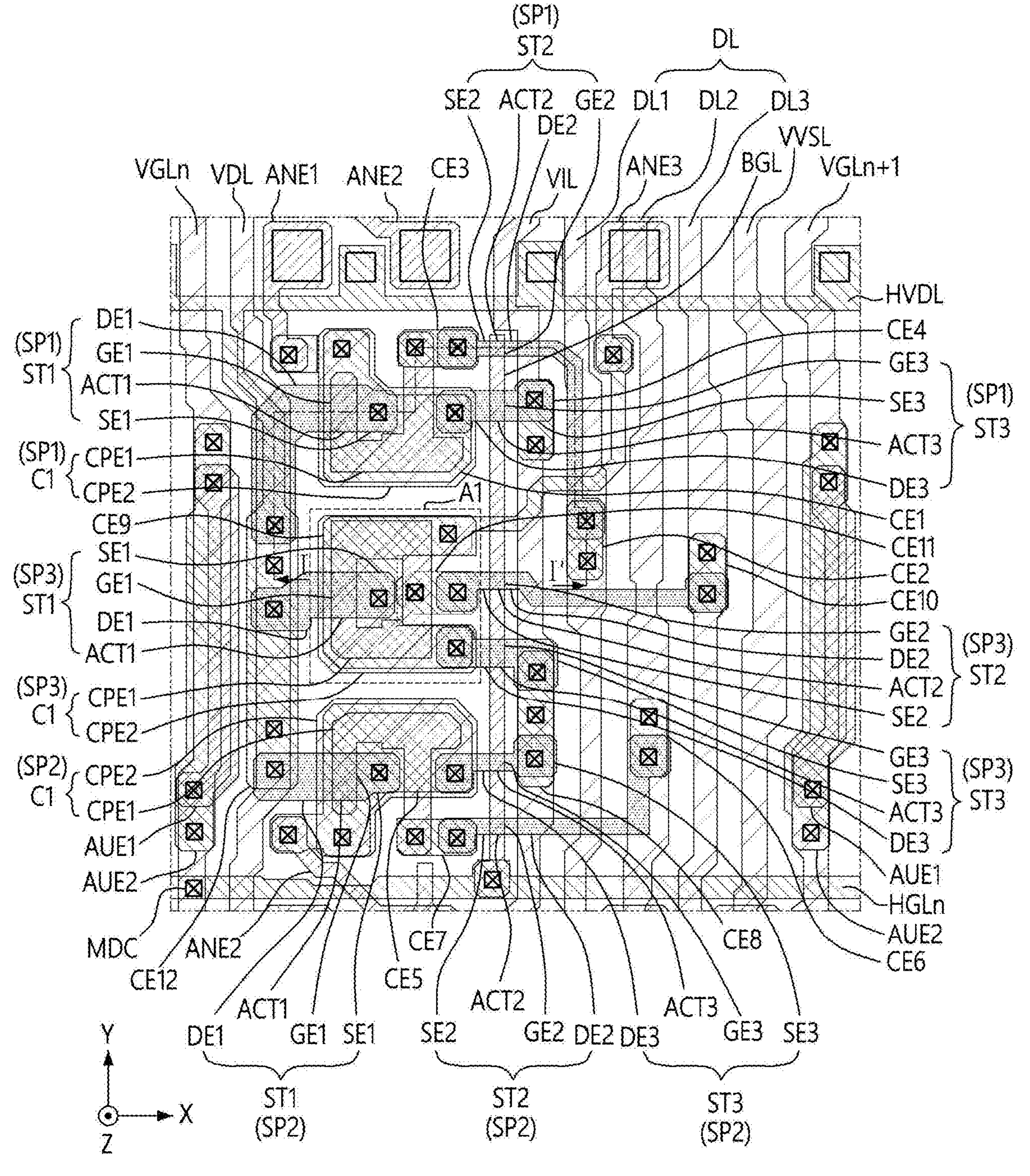
FIGS. 5 and 6 are plan views showing a thin-film transistor layer of a display device according to one or more embodiments.
Figure 6:
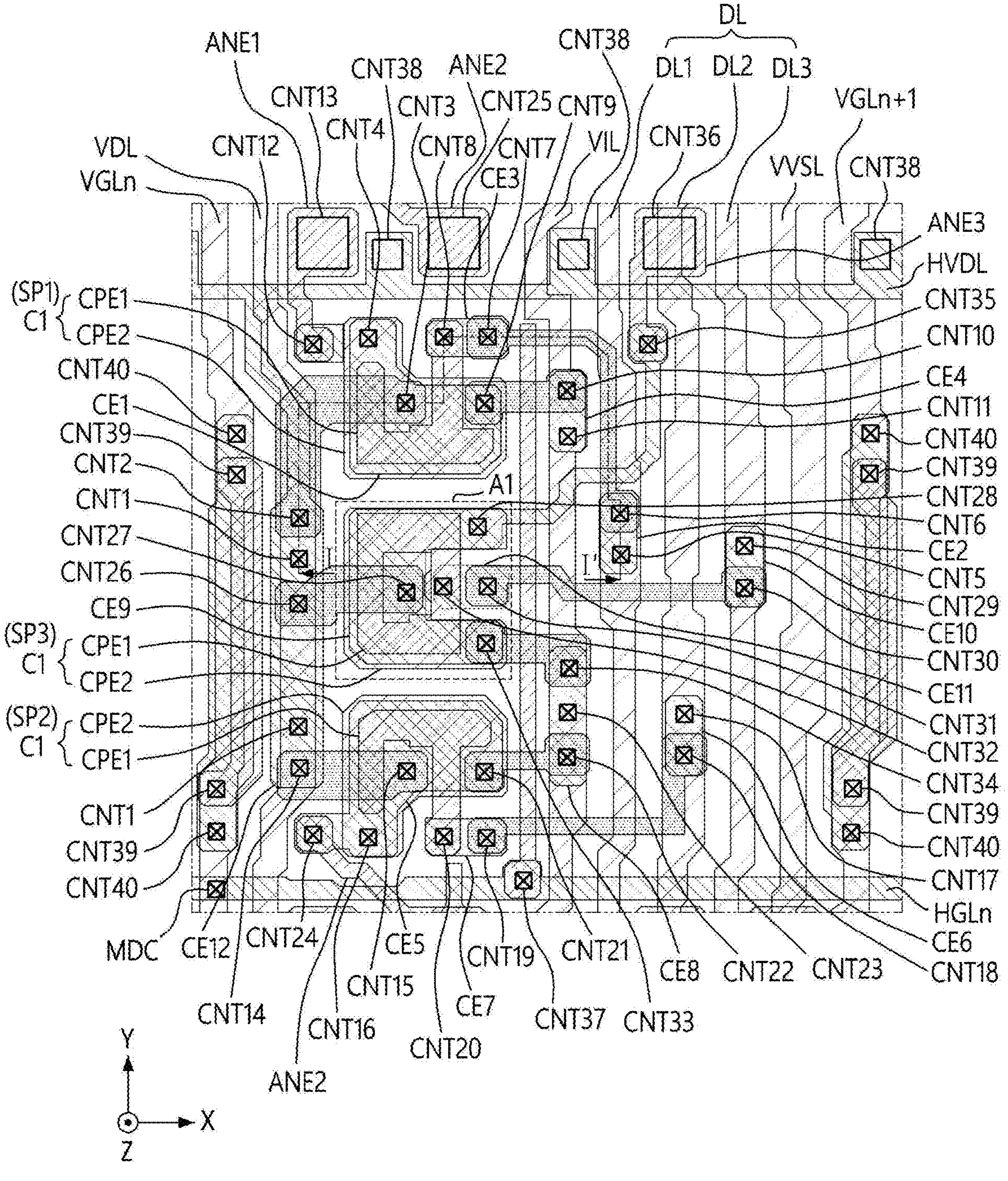
Figure 7:
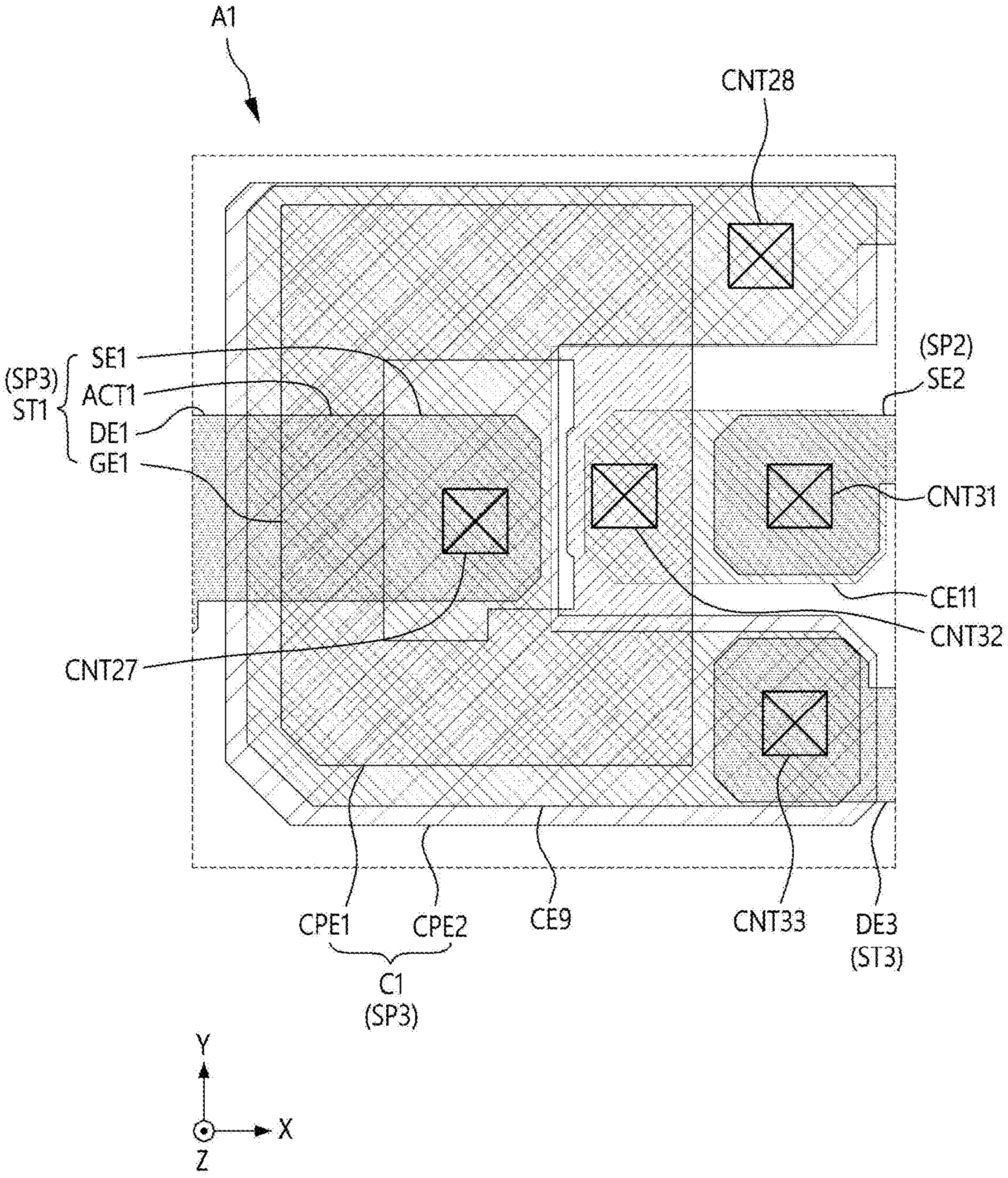
FIG. 7 is an enlarged view of an area A1 of FIGS. 5 and 6.
Figure 8:
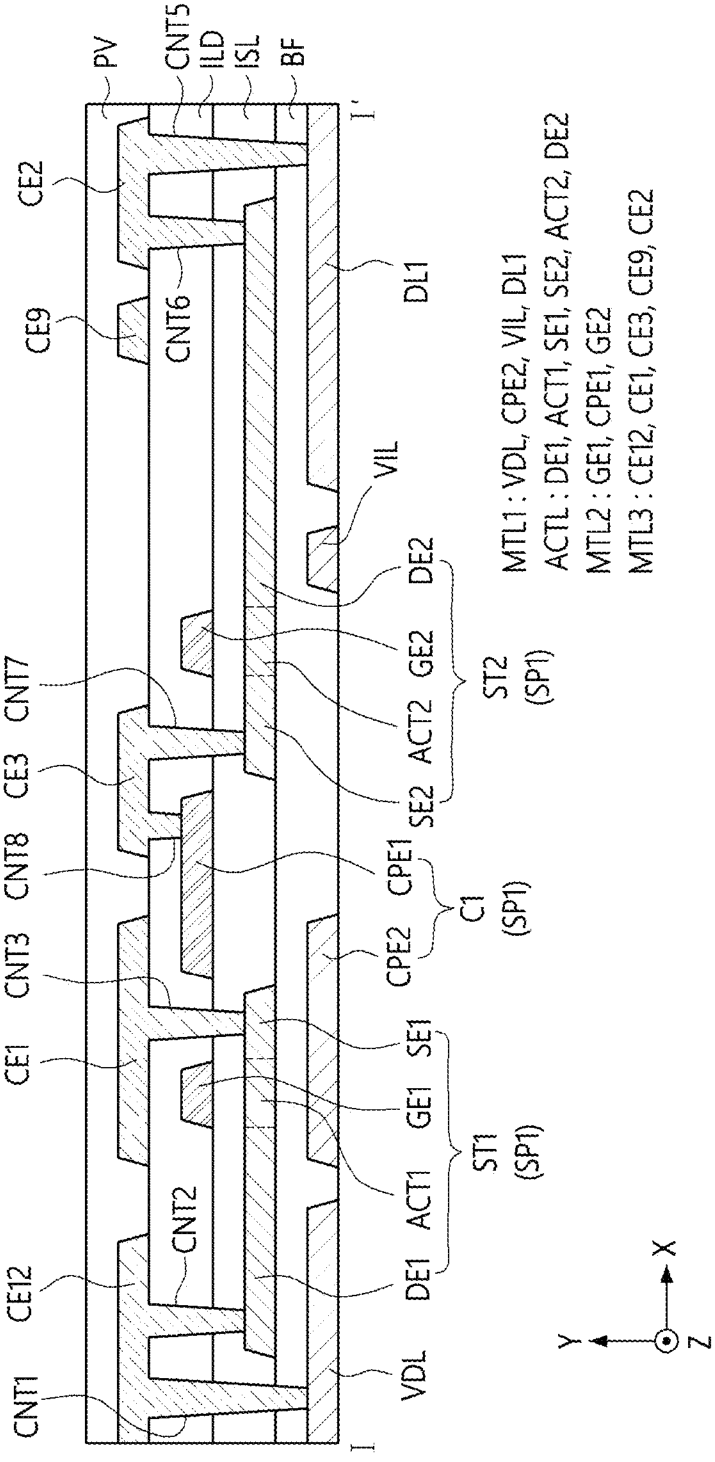
FIG. 8 is a cross-sectional view, taken along the line I-I' of FIGS. 5 and 6.

FIGS. 5 and 6 are plan views showing a thin-film transistor layer of a display device according to one or more embodiments. FIGS. 5 and 6 are the same figure with different reference numerals. FIG. 7 is an enlarged view of an area A1 of FIGS. 5 and 6. FIG. 8 is a cross-sectional view, taken along the line I-I' of FIGS. 5 and 6.

Referring to FIGS. 5 to 8, the display area DA may include first to third pixels SP1, SP2, and SP3, a first voltage line VDL, a horizontal voltage line HVDL, an initialization voltage line VIL, the $n^{th}$ vertical gate line VGLn, the $(n+1)^{th}$ vertical gate line VGL(n+1), the $n^{th}$ horizontal gate line HGLn, an auxiliary gate line BGL, data lines DL, and a vertical voltage line VVSL.

The pixels SP may include first to third pixels SP1, SP2, and SP3. The pixel circuit of the first pixel SP1, the pixel circuit of the third pixel SP3, and the pixel circuit of the second pixel SP2 may be arranged along the direction opposite to the second direction (y-axis direction). It should be understood, however, that the present disclosure is not limited thereto.

The first voltage line VDL may be disposed on a first metal layer MTL1 on the substrate SUB. The first voltage lines VDL may be disposed on the left side of the pixel circuits of the first to third pixels SP1, SP2, and SP3. The first voltage line VDL may overlap with a twelfth connection electrode CE12 of the third metal layer MTL3. The first voltage line VDL may be connected to the twelfth connection electrode CE12 through a plurality of first contact holes CNT1. The twelfth connection electrode CE12 may be formed integrally with the horizontal voltage line HVDL, but the present disclosure is not limited thereto. The twelfth connection electrode CE12 may be connected to the drain electrode DE1 of the first transistor ST1 of the first pixel SP1 through a second contact hole CNT2, to the drain electrode DE1 of the first transistor ST1 of the second pixel SP2 through a fourteenth contact hole CNT14, and to the drain electrode DE1 of the first transistor ST1 of the third pixel SP3 through a twenty-sixth contact hole CNT26. Accordingly, the first voltage line VDL may supply a driving voltage to the first to third pixels SP1, SP2, and SP3 through the twelfth connection electrode CE12.

The horizontal voltage line HVDL may be disposed on the third metal layer MTL3. The third metal layer MTL3 may be disposed on the interlayer dielectric layer ILD covering the second metal layer MTL2. The horizontal voltage line HVDL may be disposed on the upper side of the pixel circuit of the first pixel SP1. The horizontal voltage line HVDL may be connected to the first voltage line VDL through the twelfth connection electrode CE12 to receive a driving voltage. For example, the horizontal voltage line HVDL may supply the driving voltage or the high-level voltage to the alignment electrode of the fourth metal layer through a plurality of thirty-eighth contact holes CNT38.

The initialization voltage line VIL may be disposed on the first metal layer MTL1. The initialization voltage line VIL may be disposed on the right side of the auxiliary gate line BGL. A fourth connection electrode CE4 of the third metal layer MTL3 may be connected to the source electrode SE3 of the third transistor ST3 of the first pixel SP1 through a tenth contact hole CNT10 and may be connected to the initialization voltage line VIL through an eleventh contact hole CNT11. An eighth connection electrode CE8 of the third metal layer MTL3 may be connected to the source electrode SE3 of the third transistor ST3 of the second pixel SP2 through a twenty-second contact hole CNT22, may be connected to the initialization voltage line VIL through a twenty-third contact hole CNT23, and may be connected to the source electrode SE3 of the third transistor ST3 of the third pixel SP3 through a thirty-fourth contact hole CNT34. Accordingly, the initialization voltage line VIL may supply an initialization voltage to the third transistor ST3 of each of the first to third pixels SP1, SP2, and SP3, and may receive a sensing signal from the third transistor ST3.

The vertical gate lines VGL may be disposed on the first metal layer MTL1. The $n^{th}$ vertical gate line VGLn may be disposed on the left side of the first voltage line VDL. The $(n+1)^{th}$ vertical gate line VGL(n+1) may be disposed on the right side of the vertical voltage line VVSL. The $n^{th}$ and $(n+1)^{th}$ vertical gate lines VGLn and VGL(n+1) may overlap with a first auxiliary electrode AUE1 of the second metal layer MTL2 and a second auxiliary electrode AUE2 of the third metal layer MTL3. The $n^{th}$ and $(n+1)^{th}$ vertical gate lines VGLn and VGL(n+1) may be connected to the first auxiliary electrode AUE1 through a plurality of thirty-ninth contact holes CNT39, and may be connected to the second auxiliary electrode AUE2 through a plurality of fortieth contact holes CNT40. Accordingly, the vertical gate lines VGL may be connected to the first and second auxiliary electrodes AUE1 and AUE2, thereby reducing the line resistance.

The $n^{th}$ vertical gate line VGLn may be connected to the $n^{th}$ horizontal gate line HGLn of the third metal layer MTL3 through the contact point MDC. The $n^{th}$ vertical gate line VGLn may supply a gate signal to the $n^{th}$ horizontal gate line HGLn. The $n^{th}$ horizontal gate lines HGLn may be disposed on the lower side of the pixel circuit of the second pixel SP2. The $n^{th}$ horizontal gate line HGLn may supply a gate signal received from the $n^{th}$ vertical gate lines VGLn to the auxiliary gate line BGL.

The auxiliary gate line BGL may be disposed in the second metal layer MTL2. The second metal layer MTL2 may be disposed on a gate insulator ISL covering the active layer ACTL. The auxiliary gate line BGL may protrude from the $n^{th}$ horizontal gate line HGLn in the second direction (y-axis direction). The auxiliary gate lines BGL may be disposed on the right side of the pixel circuits of the first to third pixels SP1, SP2 and SP3. The auxiliary gate lines BGL may supply the gate signal received from the $n^{th}$ horizontal gate lines HGLn to the second and third transistors ST2 and ST3 of each of the first to third pixels SP1, SP2, and SP3.

The first data line DL1 may be disposed on the first metal layer MTL1. The first data line DL1 may be disposed on the right side of the initialization voltage line VIL. A second connection electrode CE2 of the third metal layer MTL3 may be connected to the first data line DL1 through a fifth contact hole CNT5 and may be connected to the drain electrode DE2 of the second transistor ST2 of the first pixel SP1 through a sixth contact hole CNT6. Accordingly, the first data line DL1 may supply a data voltage to the second transistor ST2 of the first pixel SP1 through the second connection electrode CE2.

The second data line DL2 may be disposed on the first metal layer MTL1. The second data line DL2 may be disposed on the right side of the first data line DL1. A sixth connection electrode CE6 of the third metal layer MTL3 may be connected to the second data line DL2 through a seventeenth contact hole CNT17 and may be connected to the drain electrode DE2 of the second transistor ST2 of the second pixel SP2 through an eighteenth contact hole CNT18. Accordingly, the second data line DL2 may supply a data voltage to the second transistor ST2 of the second pixel SP2 through the sixth connection electrode CE6.

The third data line DL3 may be disposed on the first metal layer MTL1. The third data line DL3 may be disposed on the right side of the second data line DL2. A tenth connection electrode CE10 of the third metal layer MTL3 may be connected to the third data line DL3 through a twenty-ninth contact hole CNT29 and may be connected to the drain electrode DE2 of the second transistor ST2 of the third pixel SP3 through a thirtieth contact hole CNT30. Accordingly, the third data line DL3 may supply a data voltage to the second transistor ST2 of the third pixel SP3 through the tenth connection electrode CE10.

The vertical voltage line VVSL may be disposed on the first metal layer MTL1. The vertical voltage line VVSL may be disposed on the right side of the third data line DL3. The vertical voltage line VVSL may be electrically connected to the second voltage line VSL of FIG. 4. The vertical voltage line VVSL may supply a low-level voltage to the second voltage line VSL.

The pixel circuit of the first pixel SP1 may include the first to third transistors ST1, ST2, and ST3. The first transistor ST1 of the first pixel SP1 may include an active area ACT1, a gate electrode GE1, a drain electrode DE1, and a source electrode SE1. The active region ACT1 of the first transistor ST1 may be disposed in the active layer ACTL, and may overlap with the gate electrode GE1 of the first transistor ST1. The active layer ACTL may be disposed on the buffer layer BF covering the first metal layer MTL1.

The gate electrode GE1 of the first transistor ST1 may be disposed in the second metal layer MTL2. The gate electrode GE1 of the first transistor ST1 may be a part of the first capacitor electrode CPE1 of the first capacitor C1.

The drain electrode DE1 and the source electrode SE1 of the first transistor ST1 may be formed into a conductor by heat-treating the active layer ACTL. The drain electrode DE1 and the source electrode SE1 may be made conductive as, but is not limited to, an n-type semiconductor. The drain electrode DE1 of the first transistor ST1 may be electrically connected to the first voltage line VDL through the twelfth connection electrode CE12. The drain electrode DE1 of the first transistor ST1 may receive a driving voltage from the first voltage line VDL.

The source electrode SE1 of the first transistor ST1 may be connected to a first connection electrode CE1 through a third contact hole CNT3. The first connection electrode CE1 may be connected to a second capacitor electrode CPE2 of the first metal layer MTL1 through a fourth contact hole CNT4. Accordingly, the first capacitor C1 may be formed between the first capacitor electrode CPE1 and the second capacitor electrode CPE2 as well as between the first capacitor electrode CPE1 and the first connection electrode CE1.

The first anode connection electrode ANE1 may be disposed on the second metal layer MTL2. The first anode connection electrode ANE1 may be connected to the first connection electrode CE1 through a twelfth contact hole CNT12, and may be electrically connected to the light-emitting elements ED of the first pixel SP1 through a thirteenth contact hole CNT13. The thirteenth contact hole CNT13 may be formed through the via layer VIA (e.g., see FIG. 13), the passivation layer PV (e.g., see FIG. 13), and/or the interlayer dielectric layer ILD. The passivation layer PV may be disposed on the third metal layer MTL3 and the interlayer dielectric layer ILD, and the via layer VIA may be disposed on the passivation layer PV. Accordingly, the first anode connection electrode ANE1 may supply the driving current received from the pixel circuit of the first pixel SP1 to the light-emitting elements ED.

The second transistor ST2 of the first pixel SP1 may include an active area ACT2, a gate electrode GE2, a drain electrode DE2 and a source electrode SE2. The active area ACT2 of the second transistor ST2 may be disposed in the active layer ACTL, and may overlap with the gate electrode GE2 of the second transistor ST2.

The gate electrode GE2 of the second transistor ST2 may be disposed in the second metal layer MTL2. The gate electrode GE2 of the second transistor ST2 may be a part of the auxiliary gate line BGL.

The drain electrode DE2 and the source electrode SE2 of the second transistor ST2 may be formed into a conductor by heat-treating the active layer ACTL. The drain electrode DE2 of the second transistor ST2 may be electrically connected to the first data line DL1 through the second connection electrode CE2. A second connection electrode CE2 of the third metal layer MTL3 may be connected to the first data line DL1 through a fifth contact hole CNT5 and may be connected to the drain electrode DE2 of the second transistor ST2 of the first pixel SP1 through a sixth contact hole CNT6. Accordingly, the first data line DL1 may supply a data voltage to the second transistor ST2 of the first pixel SP1 through the second connection electrode CE2.

The source electrode SE2 of the second transistor ST2 may be electrically connected to the first capacitor electrode CPE1 of the first capacitor C1 through a third connection electrode CE3. The third connection electrode CE3 of the third metal layer MTL3 may be connected to the source electrode SE2 of the second transistor ST2 through a seventh contact hole CNT7, and may be connected to the first capacitor electrode CPE1 of the first capacitor C1 through an eighth contact hole CNT8.

The third transistor ST3 of the first pixel SP1 may include an active area ACT3, a gate electrode GE3, a drain electrode DE3 and a source electrode SE3. The active area ACT3 of the third transistor ST3 may be disposed in the active layer ACTL, and may overlap with the gate electrode GE3 of the third transistor ST3.

The gate electrode GE3 of the third transistor ST3 may be disposed at the second metal layer MTL2. The gate electrode GE3 of the third transistor ST3 may be a part of the auxiliary gate line BGL.

The drain electrode DE3 and the source electrode SE3 of the third transistor ST3 may be formed into a conductor by heat-treating the active layer ACTL. The drain electrode DE3 of the third transistor ST3 may be connected to the first connection electrode CE1 through a ninth contact hole CNT9. The drain electrode DE3 of the third transistor ST3 may be electrically connected to the source electrode SE1 of the first transistor ST1 and the second capacitor electrode CPE2 of the first capacitor C1 through the first connection electrode CE1.

The source electrode SE3 of the third transistor ST3 may be electrically connected to the initialization voltage line VIL through the fourth connection electrode CE4. The fourth connection electrode CE4 may be connected to the source electrode SE3 of the third transistor ST3 through a tenth contact hole CNT10 and may be connected to the initialization voltage line VIL through the eleventh contact hole CNT11. The source electrode SE3 of the third transistor ST3 may receive an initialization voltage from the initialization voltage line VIL. The source electrode SE3 of the third transistor ST3 may supply a sensing signal to the initialization voltage line VIL.

The pixel circuit of the second pixel SP2 may include the first to third transistors ST1, ST2 and ST3. The first transistor ST1 of the second pixel SP2 may include an active area ACT1, a gate electrode GE1, a drain electrode DE1, and a source electrode SE1. The active region ACT1 of the first transistor ST1 may be disposed in the active layer ACTL, and may overlap with the gate electrode GE1 of the first transistor ST1.

The gate electrode GE1 of the first transistor ST1 may be disposed in the second metal layer MTL2. The gate electrode GE1 of the first transistor ST1 may be a part of the first capacitor electrode CPE1 of the first capacitor C1.

The drain electrode DE1 and the source electrode SE1 of the first transistor ST1 may be formed into a conductor by heat-treating the active layer ACTL. The drain electrode DE1 and the source electrode SE1 may be made conductive as, but is not limited to, an n-type semiconductor. The drain electrode DE1 of the first transistor ST1 may be electrically connected to the first voltage line VDL through the twelfth connection electrode CE12. The drain electrode DE1 of the first transistor ST1 may receive a driving voltage from the first voltage line VDL.

The source electrode SE1 of the first transistor ST1 may be connected to a fifth connection electrode CE5 through a fifteenth contact hole CNT15. The fifth connection electrode CE5 may be connected to the second capacitor electrode CPE2 of the first metal layer MTL1 through a sixteenth contact hole CNT16. Accordingly, the first capacitor C1 may be formed between the first capacitor electrode CPE1 and the second capacitor electrode CPE2 as well as between the first capacitor electrode CPE1 and the first connection electrode CE1.

The second anode connection electrode ANE2 may be disposed on the second metal layer MTL2. The second anode connection electrode ANE2 may be connected to the fifth connection electrode CE5 through a twenty-fourth contact hole CNT24, and may be electrically connected to the light-emitting elements ED of the second pixel SP2 through a twenty-fifth contact hole CNT25. The twenty-fifth contact hole CNT25 may be formed through the via layer VIA, the passivation layer PV, and the interlayer dielectric layer IL". Accordingly, the second anode connection electrode ANE2 may supply the driving current received from the pixel circuit of the second pixel SP2 to the light-emitting elements ED.

The second transistor ST2 of the second pixel SP2 may include an active area ACT2, a gate electrode GE2, a drain electrode DE2, and a source electrode SE2. The active area ACT2 of the second transistor ST2 may be disposed in the active layer ACTL, and may overlap with the gate electrode GE2 of the second transistor ST2.

The gate electrode GE2 of the second transistor ST2 may be disposed in the second metal layer MTL2. The gate electrode GE2 of the second transistor ST2 may be a part of the auxiliary gate line BGL.

The drain electrode DE2 and the source electrode SE2 of the second transistor ST2 may be formed into a conductor by heat-treating the active layer ACTL. The drain electrode DE2 of the second transistor ST2 may be electrically connected to the second data line DL2 through the sixth connection electrode CE6. A sixth connection electrode CE6 of the third metal layer MTL3 may be connected to the second data line DL2 through the seventeenth contact hole CNT17 and may be connected to the drain electrode DE2 of the second transistor ST2 of the second pixel SP2 through the eighteenth contact hole CNT18. Accordingly, the second data line DL2 may supply a data voltage to the second transistor ST2 of the second pixel SP2 through the sixth connection electrode CE6.

The source electrode SE2 of the second transistor ST2 may be electrically connected to the first capacitor electrode CPE1 of the first capacitor C1 through a seventh connection electrode CE7. The seventh connection electrode CE7 of the third metal layer MTL3 may be connected to the source electrode SE2 of the second transistor ST2 through a nineteenth contact hole CNT19, and may be connected to the first capacitor electrode CPE1 of the first capacitor C1 through a twentieth contact hole CNT20.

The third transistor ST3 of the second pixel SP2 may include the active area ACT3, the gate electrode GE3, the drain electrode DE3, and the source electrode SE3. The active area ACT3 of the third transistor ST3 may be disposed in the active layer ACTL, and may overlap with the gate electrode GE3 of the third transistor ST3.

The gate electrode GE3 of the third transistor ST3 may be disposed at the second metal layer MTL2. The gate electrode GE3 of the third transistor ST3 may be a part of the auxiliary gate line BGL.

The drain electrode DE3 and the source electrode SE3 of the third transistor ST3 may be formed into a conductor by heat-treating the active layer ACTL. The drain electrode DE3 of the third transistor ST3 may be connected to the fifth connection electrode CE5 through a twenty-first contact hole CNT21. The drain electrode DE3 of the third transistor ST3 may be electrically connected to the source electrode SE1 of the first transistor ST1 and the second capacitor electrode CPE2 of the first capacitor C1 through the fifth connection electrode CE5.

The source electrode SE3 of the third transistor ST3 may be electrically connected to the initialization voltage line VIL through the eighth connection electrode CE8. The eighth connection electrode CE8 may be connected to the source electrode SE3 of the third transistor ST3 through the twenty-second contact hole CNT22 and may be connected to the initialization voltage line VIL through the twenty-third contact hole CNT23. The source electrode SE3 of the third transistor ST3 may receive an initialization voltage from the initialization voltage line VIL. The source electrode SE3 of the third transistor ST3 may supply a sensing signal to the initialization voltage line VIL.

The pixel circuit of the third pixel SP3 may include the first to third transistors ST1, ST2, and ST3. The first transistor ST1 of the third pixel SP3 may include the active area ACT1, the gate electrode GE1, the drain electrode DE1, and the source electrode SE1. The active region ACT1 of the first transistor ST1 may be disposed in the active layer ACTL, and may overlap with the gate electrode GE1 of the first transistor ST1.

The gate electrode GE1 of the first transistor ST1 may be disposed in the second metal layer MTL2. The gate electrode GE1 of the first transistor ST1 may be a part of the first capacitor electrode CPE1 of the first capacitor C1.

The drain electrode DE1 and the source electrode SE1 of the first transistor ST1 may be formed into a conductor by heat-treating the active layer ACTL. The drain electrode DE1 and the source electrode SE1 may be made conductive as, but is not limited to, an n-type semiconductor. The drain electrode DE1 of the first transistor ST1 may be electrically connected to the first voltage line VDL through the twelfth connection electrode CE12. The drain electrode DE1 of the first transistor ST1 may receive a driving voltage from the first voltage line VDL.

The source electrode SE1 of the first transistor ST1 may be connected to a ninth connection electrode CE9 through a twenty-seventh contact hole CNT27. The ninth connection electrode CE9 may be connected to the second capacitor electrode CPE2 of the first metal layer MTL1 through a twenty-eighth contact hole CNT28. Accordingly, the first capacitor C1 may be formed between the first capacitor electrode CPE1 and the second capacitor electrode CPE2 as well as between the first capacitor electrode CPE1 and the first connection electrode CE1.

The third anode connection electrode ANE3 may be disposed on the second metal layer MTL2. The third anode connection electrode ANE3 may be connected to the ninth connection electrode CE9 through a thirty-fifth contact hole CNT35, and may be electrically connected to the light-emitting elements ED of the third pixel SP3 through a thirty-sixth contact hole CNT36. The thirty-sixth contact hole CNT36 may be formed through the via layer VIA, the passivation layer PV, and the interlayer dielectric layer ILD. Accordingly, the third anode connection electrode ANE3 may supply the driving current received from the pixel circuit of the third pixel SP3 to the light-emitting elements ED.

The second transistor ST2 of the third pixel SP3 may include the active area ACT2, the gate electrode GE2, the drain electrode DE2, and the source electrode SE2. The active area ACT2 of the second transistor ST2 may be disposed in the active layer ACTL, and may overlap with the gate electrode GE2 of the second transistor ST2.

The gate electrode GE2 of the second transistor ST2 may be disposed in the second metal layer MTL2. The gate electrode GE2 of the second transistor ST2 may be a part of the auxiliary gate line BGL.

The drain electrode DE2 and the source electrode SE2 of the second transistor ST2 may be formed into a conductor by heat-treating the active layer ACTL. The drain electrode DE2 of the second transistor ST2 may be electrically connected to the third data line DL3 through the tenth connection electrode CE10. A tenth connection electrode CE10 of the third metal layer MTL3 may be connected to the third data line DL3 through a twenty-ninth contact hole CNT29 and may be connected to the drain electrode DE2 of the second transistor ST2 of the third pixel SP3 through a thirtieth contact hole CNT30. Accordingly, the third data line DL3 may supply a data voltage to the second transistor ST2 of the third pixel SP3 through the tenth connection electrode CE10.

The source electrode SE2 of the second transistor ST2 may be electrically connected to the first capacitor electrode CPE1 of the first capacitor C1 through an eleventh connection electrode CE11. The eleventh connection electrode CE11 of the third metal layer MTL3 may be connected to the source electrode SE2 of the second transistor ST2 through a thirty-first contact hole CNT31, and may be connected to the first capacitor electrode CPE1 of the first capacitor C1 through a thirty-second contact hole CNT32.

The third transistor ST3 of the third pixel SP3 may include the active area ACT3, the gate electrode GE3, the drain electrode DE3, and the source electrode SE3. The active area ACT3 of the third transistor ST3 may be disposed in the active layer ACTL, and may overlap with the gate electrode GE3 of the third transistor ST3.

The gate electrode GE3 of the third transistor ST3 may be disposed at the second metal layer MTL2. The gate electrode GE3 of the third transistor ST3 may be a part of the auxiliary gate line BGL.

The drain electrode DE3 and the source electrode SE3 of the third transistor ST3 may be formed into a conductor by heat-treating the active layer ACTL. The drain electrode DE3 of the third transistor ST3 may be connected to the ninth connection electrode CE9 through a thirty-third contact hole CNT33. The drain electrode DE3 of the third transistor ST3 may be electrically connected to the source electrode SE1 of the first transistor ST1 and the second capacitor electrode CPE2 of the first capacitor C1 through the ninth connection electrode CE9.

The source electrode SE3 of the third transistor ST3 may be electrically connected to the initialization voltage line VIL through the eighth connection electrode CE8. The eighth connection electrode CE8 may be connected to the source electrode SE3 of the third transistor ST3 through the thirty-fourth contact hole CNT34 and may be connected to the initialization voltage line VIL through the twenty-third contact hole CNT23. The source electrode SE3 of the third transistor ST3 may receive an initialization voltage from the initialization voltage line VIL. The source electrode SE3 of the third transistor ST3 may supply a sensing signal to the initialization voltage line VIL.

In FIG. 7, the first capacitor electrode CPE1 of the first capacitor C1 of the third pixel SP3 may have a closed-loop shape. The first capacitor electrode CPE1 may surround the twenty-seventh contact hole CNT27, and the ninth connection electrode CE9 of the third metal layer MTL3 may be connected to the source electrode SE1 of the first transistor ST1 through the twenty-seventh contact hole CNT27. The second capacitor electrode CPE2 and the ninth connection electrode CE9 may overlap with the first capacitor electrode CPE1, and the second capacitor electrode CPE2 and the ninth connection electrode CE9 may be connected with each other through the twenty-eighth contact hole CNT28.

The upper side of the ninth connection electrode CE9 may overlap with the upper side of the first capacitor electrode CPE1 of the third pixel SP3, and the upper side of the ninth connection electrode CE9 may be closer to the pixel circuit of the first pixel SP1 than the upper side of the first capacitor electrode CPE1 of the third pixel SP3. The upper side of the second capacitor electrode CPE2 of the third pixel SP3 may overlap with the upper side of the first capacitor electrode CPE1 of the third pixel SP3, and the upper side of the second capacitor electrode CPE2 of the third pixel SP3 may be closer to the pixel circuit of the first pixel SP1 than the upper side of the first capacitor electrode CPE1 of the third pixel SP3. Accordingly, the ninth connection electrode CE9 and the second capacitor electrode CPE2 of the third pixel SP3 can block coupling capacitance between the first capacitor electrode CPE1 of the third pixel SP3 and the pixel circuit of the first pixel SP1.

The lower side of the ninth connection electrode CE9 may overlap with the lower side of the first capacitor electrode CPE1 of the third pixel SP3, and the lower side of the ninth connection electrode CE9 may be closer to the pixel circuit of the second pixel SP2 than the lower side of the first capacitor electrode CPE1 of the third pixel SP3. The lower side of the second capacitor electrode CPE2 of the third pixel SP3 may overlap with the lower side of the first capacitor electrode CPE1 of the third pixel SP3, and the lower side of the second capacitor electrode CPE2 of the third pixel SP3 may be closer to the pixel circuit of the second pixel SP2 than the lower side of the first capacitor electrode CPE1 of the third pixel SP3. Accordingly, the ninth connection electrode CE9 and the second capacitor electrode CPE2 of the third pixel SP3 can block a coupling capacitance between the first capacitor electrode CPE1 of the third pixel SP3 and the pixel circuit of the second pixel SP2.

The eleventh connection electrode CE11 may be connected to the source electrode SE2 of the second transistor ST2 through the thirty-first contact hole CNT31, and may be connected to the first capacitor electrode CPE1 of the third pixel SP3 through the thirty-second contact hole CNT32. The thirty-first contact hole CNT31 and the thirty-second contact hole CNT32 may be adjacent to each other in the first direction (x-axis direction). The ninth connection electrode CE9 and the second capacitor electrode CPE2 of the third pixel SP3 may surround the upper, lower, and left sides of the eleventh connection electrode CE11. The ninth connection electrode CE9 and the second capacitor electrode CPE2 of the third pixel SP3 may be disposed between the eleventh connection electrode CE11 and the pixel circuit of the first pixel SP1. The ninth connection electrode CE9 and the second capacitor electrode CPE2 of the third pixel SP3 may be disposed between the eleventh connection electrode CE11 and the pixel circuit of the second pixel SP2. Accordingly, the ninth connection electrode CE9 and the second capacitor electrode CPE2 of the third pixel SP3 can block a coupling capacitance between the eleventh connection electrode CE11 and the pixel circuit of the first pixel SP1 and a coupling capacitance between the eleventh connection electrode CE11 and the pixel circuit of the second pixel SP2.

In FIGS. 5 and 6, the first capacitor electrode CPE1 of the first capacitor C1 of the first pixel SP1 may have an open upper side. The first capacitor electrode CPE1 of the first pixel SP1 may have an open side that does not face the pixel circuits of the second and third pixels SP2 and SP3. The first capacitor electrode CPE1 of the first capacitor C1 of the first pixel SP1 may surround the left, right, and lower sides of the third contact hole CNT3. The first capacitor electrode CPE1 of the first pixel SP1 may not be disposed on the upper side of the third contact hole CNT3. The first connection electrode CE1 of the third metal layer MTL3 may be connected to the source electrode SE1 of the first transistor ST1 through the third contact hole CNT3. The second capacitor electrode CPE2 and the first connection electrode CE1 may overlap with the first capacitor electrode CPE1, and the second capacitor electrode CPE2 and the first connection electrode CE1 may be connected with each other through the fourth contact hole CNT4.

The lower side of the first connection electrode CE1 may overlap with the lower side of the first capacitor electrode CPE1 of the first pixel SP1, and the lower side of the first connection electrode CE1 may be closer to the pixel circuit of the third pixel SP3 than the lower side of the first capacitor electrode CPE1 of the first pixel SP1. The lower side of the second capacitor electrode CPE2 of the first pixel SP1 may overlap with the lower side of the first capacitor electrode CPE1 of the first pixel SP1, and the lower side of the second capacitor electrode CPE2 of the first pixel SP1 may be closer to the pixel circuit of the third pixel SP3 than the lower side of the first capacitor electrode CPE1 of the first pixel SP1. Accordingly, the first connection electrode CE1 and the second capacitor electrode CPE2 of the first pixel SP1 can block a coupling capacitance between the first capacitor electrode CPE1 of the first pixel SP1 and the pixel circuit of the third pixel SP3.

The third connection electrode CE3 may electrically connect the first capacitor electrode CPE1 of the first pixel SP1 with the source electrode SE2 of the second transistor ST2. The third connection electrode CE3 may be disposed on the upper side of the first connection electrode CE1 and the second capacitor electrode CPE2 of the first pixel SP1. The first connection electrode CE1 and the second capacitor electrode CPE2 of the first pixel SP1 may be disposed between the third connection electrode CE3 and the pixel circuit of the third pixel SP3. Accordingly, the first connection electrode CE1 and the second capacitor electrode CPE2 of the first pixel SP1 can block a coupling capacitance between the third connection electrode CE3 and the pixel circuit of the third pixel SP3.

The first capacitor electrode CPE1 of the first capacitor C1 of the second pixel SP2 may have an open lower side. The first capacitor electrode CPE1 of the second pixel SP2 may have an open side that does not face the pixel circuits of the first and third pixels SP1 and SP3. The first capacitor electrode CPE1 of the first capacitor C1 of the second pixel SP2 may surround the left, right and upper sides of the fifteenth contact hole CNT15. The first capacitor electrode CPE1 of the second pixel SP2 may not be disposed on the lower side of the fifteenth contact hole CNT15. The fifth connection electrode CE5 of the third metal layer MTL3 may be connected to the source electrode SE1 of the first transistor ST1 through the fifteenth contact hole CNT15. The second capacitor electrode CPE2 and the fifth connection electrode CE5 may overlap with the first capacitor electrode CPE1, and the second capacitor electrode CPE2 and the fifth connection electrode CE5 may be connected with each other through the sixteenth contact hole CNT16.

The upper side of the fifth connection electrode CE5 may overlap with the upper side of the first capacitor electrode CPE1 of the second pixel SP2, and the upper side of the fifth connection electrode CE5 may be closer to the pixel circuit of the third pixel SP3 than the upper side of the first capacitor electrode CPE1 of the second pixel SP2. The upper side of the second capacitor electrode CPE2 of the second pixel SP2 may overlap with the upper side of the first capacitor electrode CPE1 of the second pixel SP2, and the upper side of the second capacitor electrode CPE2 of the second pixel SP2 may be closer to the pixel circuit of the third pixel SP3 than the upper side of the first capacitor electrode CPE1 of the second pixel SP2. Accordingly, the fifth connection electrode CE5 and the second capacitor electrode CPE2 of the second pixel SP2 can block a coupling capacitance between the first capacitor electrode CPE1 of the second pixel SP2 and the pixel circuit of the third pixel SP3.

The seventh connection electrode CE7 may electrically connect the first capacitor electrode CPE1 of the second pixel SP2 with the source electrode SE2 of the second transistor ST2. The seventh connection electrode CE7 may be disposed on the lower side of the fifth connection electrode CE5 and the second capacitor electrode CPE2 of the second pixel SP2. The fifth connection electrode CE5 and the second capacitor electrode CPE2 of the second pixel SP2 may be disposed between the seventh connection electrode CE7 and the pixel circuit of the third pixel SP3. Accordingly, the fifth connection electrode CE5 and the second capacitor electrode CPE2 of the second pixel SP2 can block a coupling capacitance between the seventh connection electrode CE7 and the pixel circuit of the third pixel SP3.

Accordingly, color crosstalk can be prevented in the display device 10 by blocking a coupling capacitance between the pixel circuits of the first to third pixels SP1, SP2, and SP3. As a result, the image quality can be improved.

Figure 9:
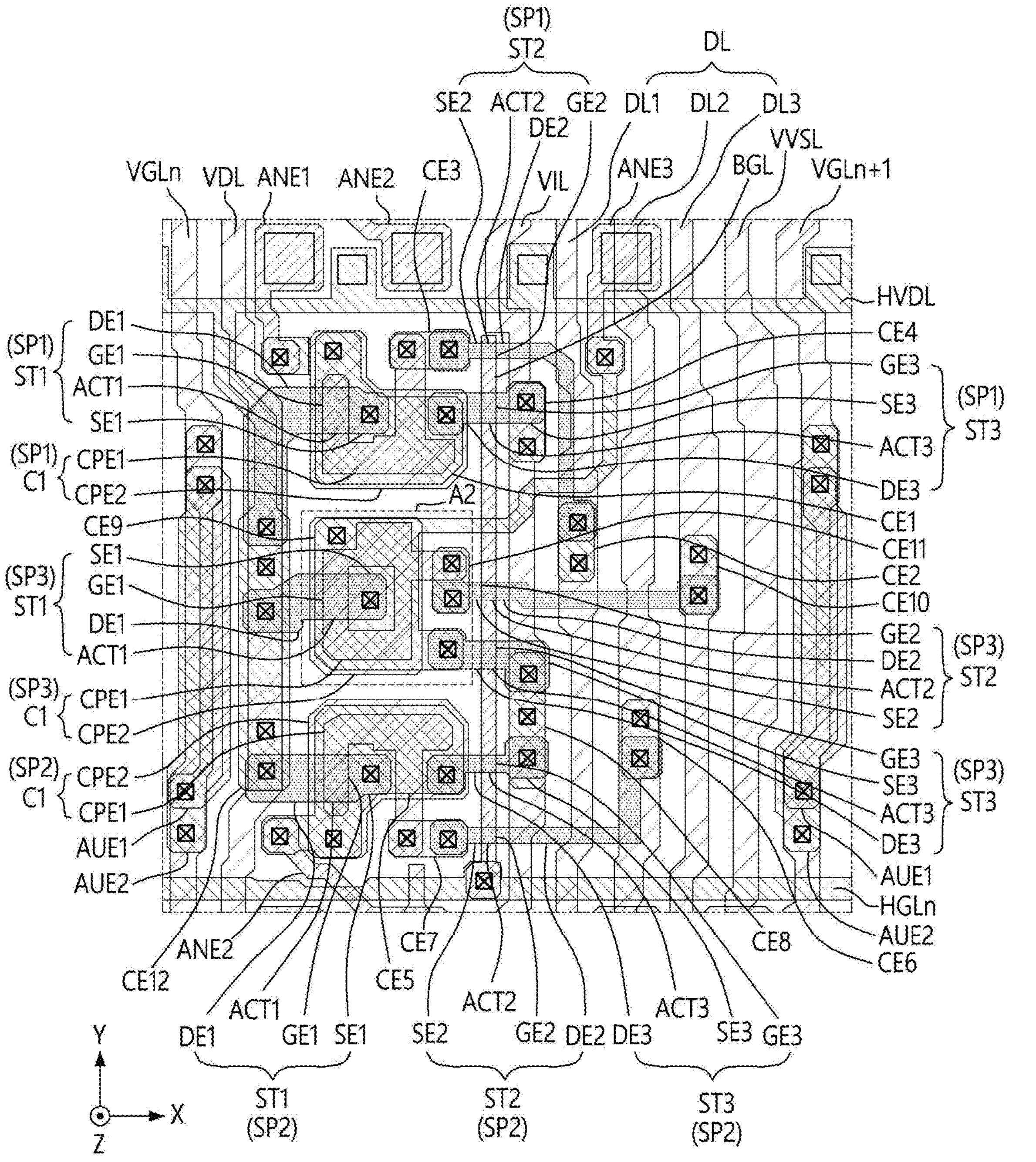
FIGS. 9 and 10 are plan views showing a thin-film transistor layer of a display device according to one or more embodiments.
Figure 10:
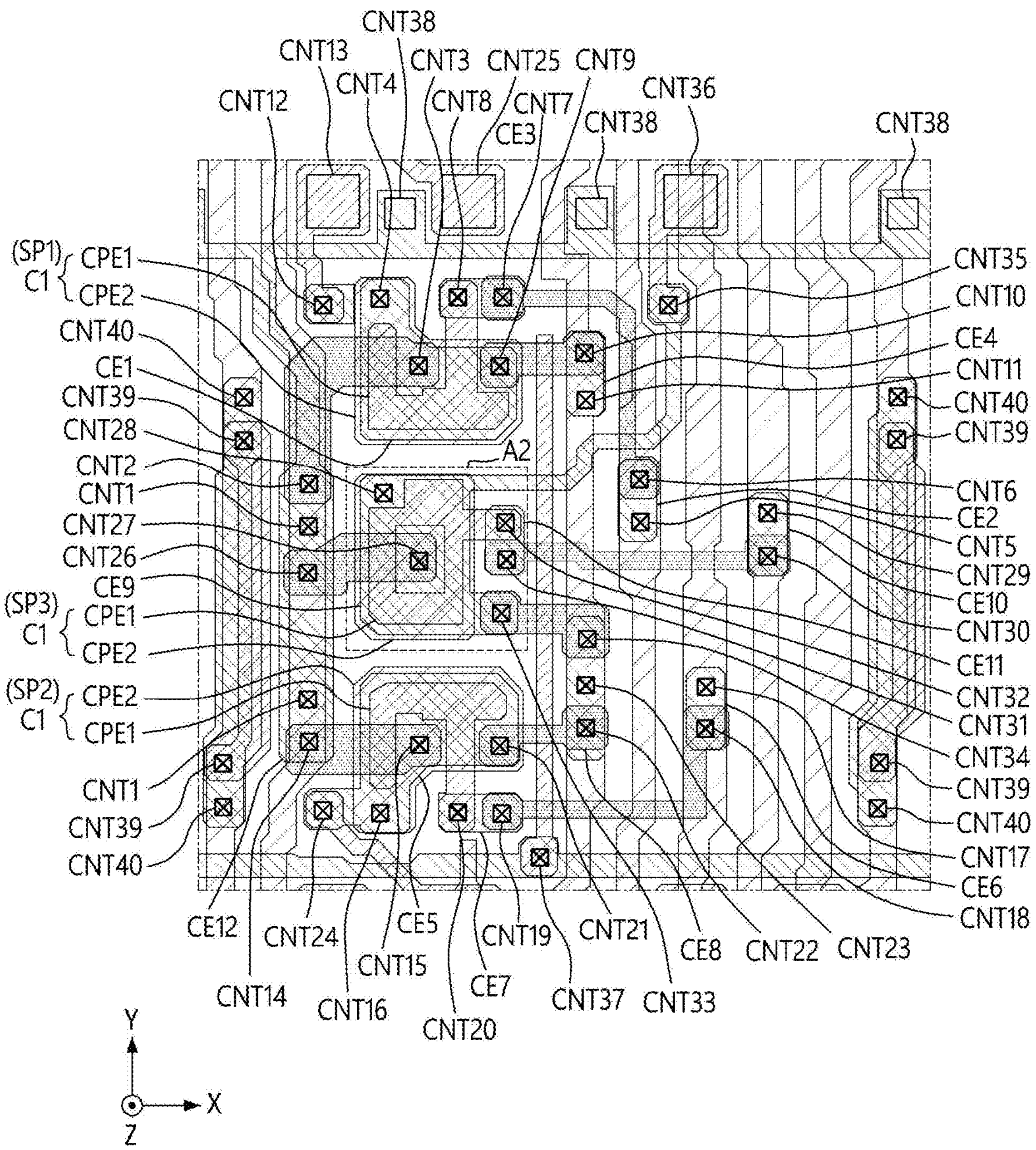
Figure 11:
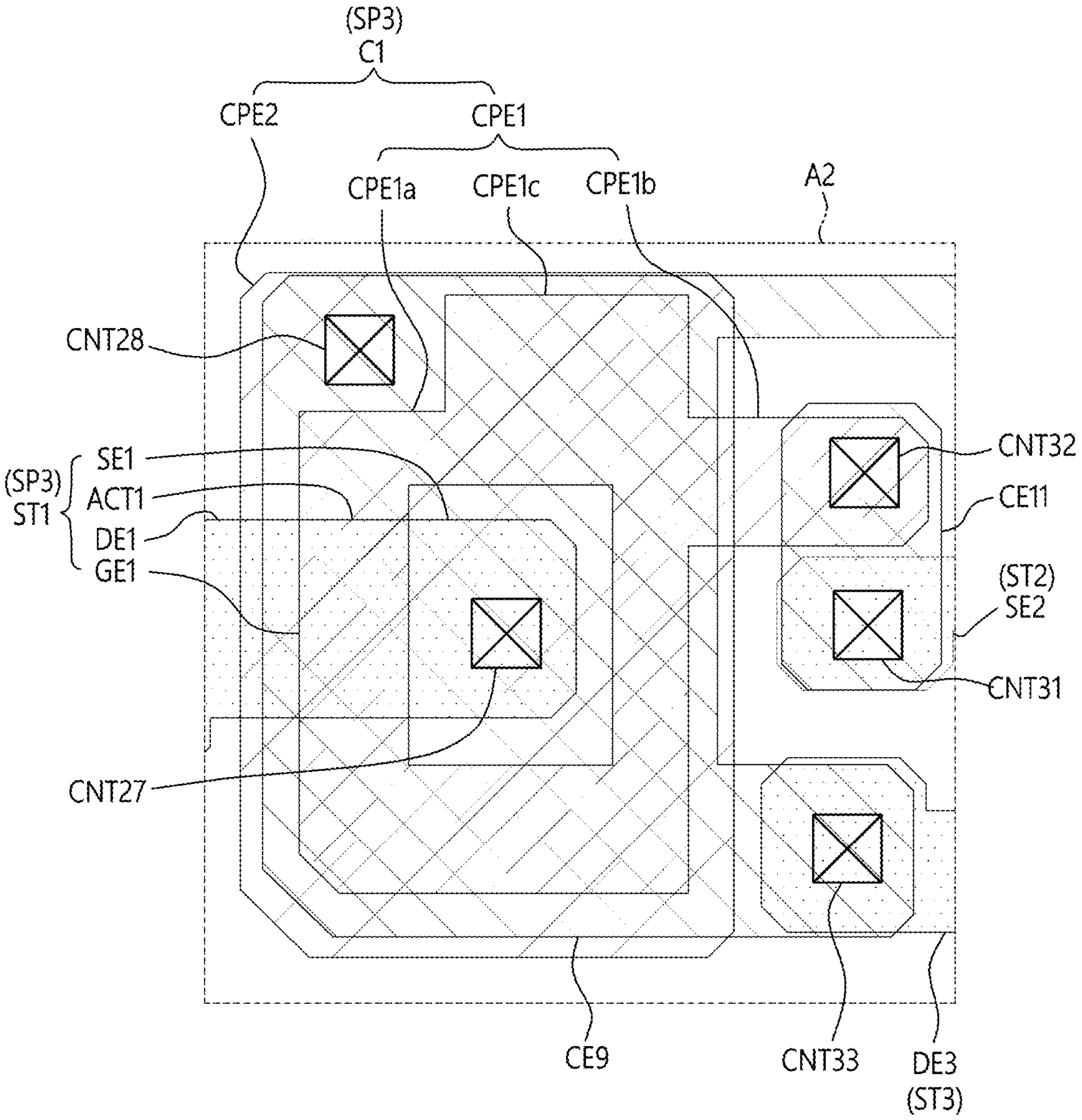
FIG. 11 is an enlarged view of an area A2 of FIGS. 9 and 10.

FIGS. 9 and 10 are plan views showing a thin-film transistor layer of a display device according to one or more embodiments. FIG. 11 is an enlarged view of area A2 of FIGS. 9 and 10. FIGS. 9 and 10 are the same figure with different reference numerals. A display device of FIGS. 9 and 10 is substantially identical to the display device of FIGS. 5 and 6 except for area A2; and, therefore, the redundant descriptions will be omitted. Referring to FIGS. 9 to 11, the display area DA may include first to third pixels SP1, SP2, and SP3, a first voltage line VDL, a horizontal voltage line HVDL, an initialization voltage line VIL, the $n^{th}$ vertical gate line VGLn, the $(n+1)^{th}$ vertical gate line VGL(n+1), the $n^{th}$ horizontal gate line HGLn, an auxiliary gate line BGL, data lines DL, and a vertical voltage line VVSL.

The first capacitor electrode CPE1 of the first capacitor C1 of the third pixel SP3 may include first to third portions CPE1*a*, CPE1*b*, and CPE1*c*. The first portion CPE1*a* of the first capacitor electrode CPE1 may have a closed-loop shape. The second portion CPE1*b* of the first capacitor electrode CPE1 may protrude from the first portion CPE1*a* in the first direction (x-axis direction). The third portion CPE1*c* of the first capacitor electrode CPE1 may protrude from the first portion CPE1*a* in the second direction (y-axis direction). The first portion CPE1*a* of the first capacitor electrode CPE1 may surround the twenty-seventh contact hole CNT27, and the ninth connection electrode CE9 of the third metal layer MTL3 may be connected to the source electrode SE1 of the first transistor ST1 through the twenty-seventh contact hole CNT27. The second capacitor electrode CPE2 and the ninth connection electrode CE9 may overlap with the first and third portions CPE1*a* and CPE1*c* of the first capacitor electrode CPE1, and the second capacitor electrode CPE2 and the ninth connection electrode CE9 may be connected with each other through the twenty-eighth contact hole CNT28. The twenty-eighth contact hole CNT28 may be disposed on the upper side of the first portion CPE1*a* of the first capacitor electrode CPE1 and may be disposed on the left side of the third portion CPE1*c*.

The upper side of the ninth connection electrode CE9 may overlap with the upper side of the first capacitor electrode CPE1 of the third pixel SP3, and the upper side of the ninth connection electrode CE9 may be closer to the pixels circuit of the first pixel SP1 than the upper side of the first capacitor electrode CPE1 of the third pixel SP3. The upper side of the second capacitor electrode CPE2 of the third pixel SP3 may overlap with the upper side of the first capacitor electrode CPE1 of the third pixel SP3, and the upper side of the second capacitor electrode CPE2 of the third pixel SP3 may be closer to the pixel circuit of the first pixel SP1 than the upper side of the first capacitor electrode CPE1 of the third pixel SP3. Accordingly, the ninth connection electrode CE9 and the second capacitor electrode CPE2 of the third pixel SP3 can block coupling capacitance between the first capacitor electrode CPE1 of the third pixel SP3 and the pixel circuit of the first pixel SP1.

The lower side of the ninth connection electrode CE9 may overlap with the lower side of the first capacitor electrode CPE1 of the third pixel SP3, and the lower side of the ninth connection electrode CE9 may be closer to the pixels circuit of the second pixel SP2 than the lower side of the first capacitor electrode CPE1 of the third pixel SP3. The lower side of the second capacitor electrode CPE2 of the third pixel SP3 may overlap with the lower side of the first capacitor electrode CPE1 of the third pixel SP3, and the lower side of the second capacitor electrode CPE2 of the third pixel SP3 may be closer to the pixel circuit of the second pixel SP2 than the lower side of the first capacitor electrode CPE1 of the third pixel SP3. Accordingly, the ninth connection electrode CE9 and the second capacitor electrode CPE2 of the third pixel SP3 can block a coupling capacitance between the first capacitor electrode CPE1 of the third pixel SP3 and the pixel circuit of the second pixel SP2.

The eleventh connection electrode CE11 may be connected to the source electrode SE2 of the second transistor ST2 through the thirty-first contact hole CNT31, and may be connected to the second portion CPE1*b* of the first capacitor electrode CPE1 of the third pixel SP3 through the thirty-second contact hole CNT32. The thirty-first contact hole CNT31 and the thirty-second contact hole CNT32 may be adjacent to each other in the second direction (y-axis direction). The ninth connection electrode CE9 may surround the upper, lower, and left sides of the eleventh connection electrode CE11. The ninth connection electrode CE9 may be disposed between the eleventh connection electrode CE11 and the pixel circuit of the first pixel SP1. The ninth connection electrode CE9 may be disposed between the eleventh connection electrode CE11 and the pixel circuit of the second pixel SP2. Accordingly, the ninth connection electrode CE9 can block a coupling capacitance between the eleventh connection electrode CE11 and the pixel circuit of the first pixel SP1 and a coupling capacitance between the eleventh connection electrode CE11 and the pixel circuit of the second pixel SP2.

Accordingly, color crosstalk can be prevented in the display device 10 by blocking a coupling capacitance between the pixel circuits of the first to third pixels SP1, SP2, and SP3. As a result, the image quality can be improved.

Figure 12:
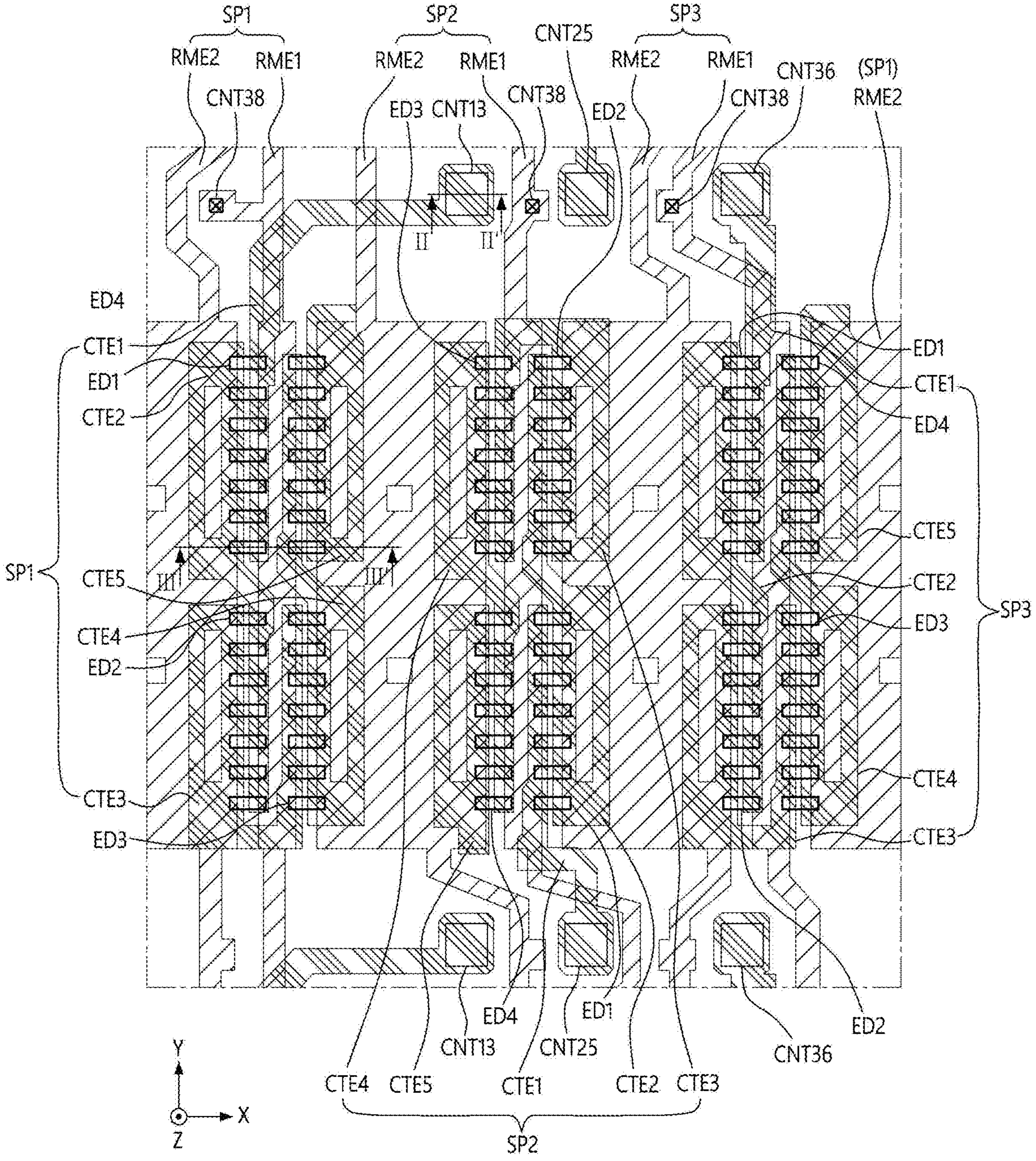
FIG. 12 is a plan view showing an emission material layer of a display device according to one or more embodiments of the present disclosure.
Figure 13:
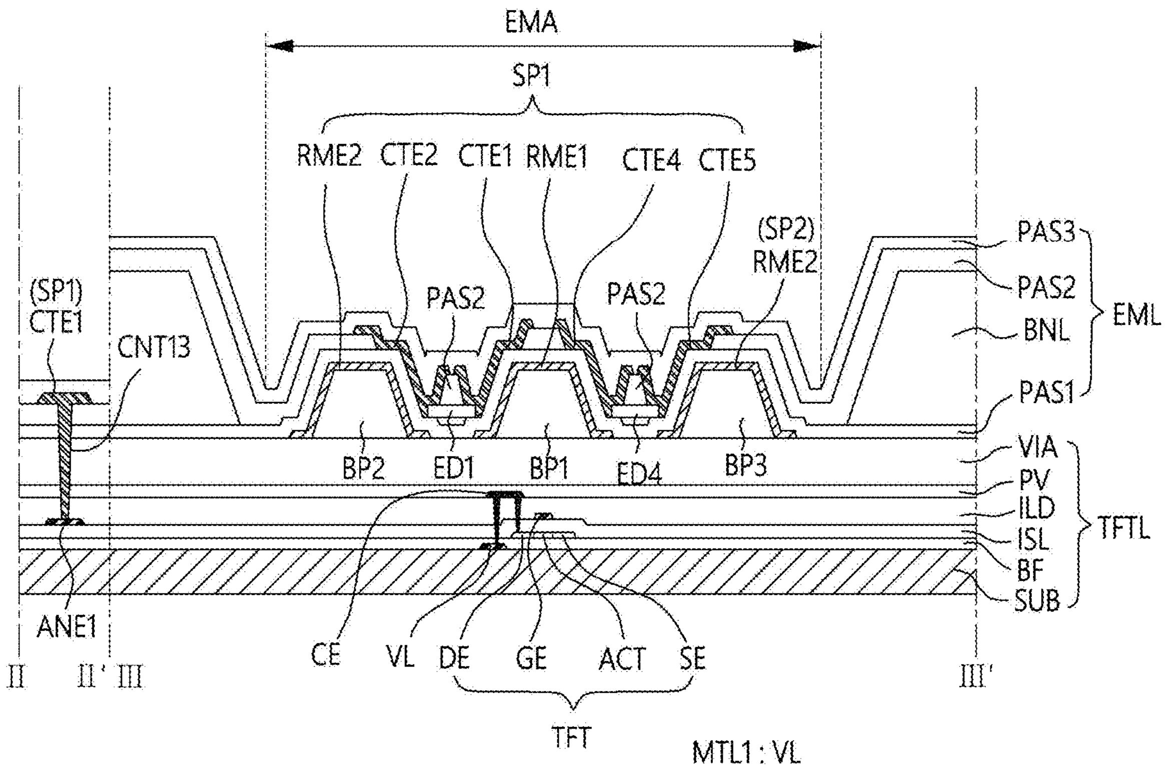
FIG. 13 is a cross-sectional view taken along the lines II-II' and III-III' of FIG. 12.

FIG. 12 is a plan view showing an emission material layer of a display device according to one or more embodiments of the present disclosure. FIG. 13 is a cross-sectional view taken along the lines II-II' and III-III' of FIG. 12. The emission material layer EML of FIGS. 12 and 13 may be disposed on the thin-film transistor layer TFTL of FIGS. 5 to 8, or the thin-film transistor layer TFTL of FIGS. 9 to 11.

Referring to FIGS. 12 and 13, the display panel 100 may include a substrate SUB, a thin-film transistor layer TFTL, and an emission material layer EML.

The thin-film transistor layer TFTL may be disposed on the substrate SUB. The thin-film transistor layer TFTL may include a first metal layer MTL1, a buffer layer BF, an active layer ACTL, a gate insulator ISL, a second metal layer MTL2, an interlayer dielectric layer ILD, a third metal layer MTL3, a passivation layer PV, and a via layer VIA.

The first metal layer MTL1 may include a voltage line VL. The voltage line VL may be one of a first voltage line VDL, an initialization voltage line VIL, a data line DL, and a vertical voltage line VVSL.

The active layer ACTL may include a drain electrode DE, an active region ACT, and a source electrode SE of the thin-film transistor TFT, and the second metal layer MTL2 may include a gate electrode GE of the thin-film transistor TFT and a first anode connection electrode ANE1. The thin-film transistor TFT may be one of the first to third transistors ST1, ST2, and ST3 of FIGS. 4 to 11.

The third metal layer MTL3 may include a connection electrode CE. The connection electrode CE may be one of the first to thirteenth connection electrodes CE1 to CE13 of FIGS. 5 to 11.

The emission material layer EML may be disposed on the thin-film transistor layer TFTL. The emission material layer EML may include first to third bank patterns BP1, BP2, and BP3, first and second electrodes RME1 and RME2, first to fourth light-emitting elements ED1, ED2, ED3, and ED4, a first insulating layer PAS1, a bank layer BNL, a second insulating layer PAS2, first to fifth contact electrodes CTE1, CTE2, CTE3, CTE4, and CTE5, and a third insulating layer PAS3.

The first to third bank patterns BP1, BP2, and BP3 may be extended in the second direction (y-axis direction) and may be spaced from one another in the first direction (x-axis direction). The first bank pattern BP1 may be disposed between the second and third bank patterns BP2 and BP3. The second bank pattern BP2 may be disposed on the left side of the first bank pattern BP1, and the third bank pattern BP3 may be disposed on the right side of the first bank pattern BP1. Each of the first to third bank patterns BP1, BP2, and BP3 may protrude upward (in the z-axis direction, i.e., in the thickness direction of the substrate SUB) on the via layer VIA. Each of the first to third bank patterns BP1, BP2, and BP3 may have inclined side surfaces. The plurality of first light-emitting elements ED1 and the plurality of second light-emitting elements ED2 of the first pixel SP1 may be disposed between the first and second bank patterns BP1 and BP2 that are spaced from each other. The plurality of third light-emitting elements ED3 and the plurality of fourth light-emitting elements ED4 of the first pixel SP1 may be disposed between the first and third bank patterns BP1 and BP3 that are spaced from each other. The first to third bank patterns BP1, BP2 and BP3 may be disposed as island-shaped patterns on the front surface of the display area DA.

The first and second electrodes RME1 and RME2 of each of the first to third pixels SP1, SP2, and SP3 may be disposed in a fourth electrode layer MTL4. The fourth electrode layer MTL4 may be disposed on the via layer VIA and the first to third bank patterns BP1, BP2, and BP3. The first and second electrodes RME1 and RME2 of each of the first to third pixels SP1, SP2, and SP3 may be extended in the second direction (y-axis direction). The first electrode RME1 of the first pixel SP1 may be disposed between the second electrode RME2 of the first pixel SP1 and the second electrode RME2 of the second pixel SP2. The first electrode RME1 of the second pixel SP2 may be disposed between the second electrode RME2 of the second pixel SP2 and the second electrode RME2 of the third pixel SP3. The first electrode RME1 of the third pixel SP3 may be disposed on the right side of the second electrode RME2 of the third pixel SP3.

Each of the first and second electrodes RME1 and RME2 may cover the upper surface and an inclined side surface of one of the first to third bank patterns BP1, BP2, and BP3. Accordingly, each of the first and second electrodes RME1 and RME2 may reflect the light emitted from the first to fourth light-emitting elements ED1, ED2, ED3, and ED4 upwardly (in the z-axis direction).

The first and second electrodes RME1 and RME2 may be alignment electrodes that align the first to fourth light-emitting elements ED1, ED2, ED3, and ED4 during the process of fabricating the display device 10. The plurality of first electrodes RME1 may be connected to the horizontal voltage line HVDL of the third metal layer MTL3 through the plurality of 38th contact holes CNT38. The first electrode RME1 may receive a driving voltage or a high-level voltage from the horizontal voltage line HVDL. The plurality of second electrodes RME2 may be electrically connected to the second voltage line VSL of FIG. 4 to receive a low-level voltage from the second voltage line VSL.

The first to fourth light-emitting elements ED1, ED2, ED3, and ED4 may be aligned between the first electrode RME1 and the second electrode RME2. The first insulating layer PAS1 may cover the first and second electrodes RME1 and RME2. The first to fourth light-emitting elements ED1, ED2, ED3, and ED4 may be insulated from the first and second electrodes RME1 and RME2 by the first insulating layer PAS1. Each of the first and second electrodes RME1 and RME2 may receive an alignment signal, and an electric field may be formed between the first and second electrodes RME1 and RME2. For example, the first to fourth light-emitting elements ED1, ED2, ED3, and ED4 may be ejected onto the first and second electrodes RME1 and RME2 via an inkjet printing process. The first to fourth light-emitting elements ED1, ED2, ED3, and ED4 dispersed in the ink may be aligned by receiving a dielectrophoresis force by the electric field formed between the first and second electrodes RME1 and RME2. Accordingly, the plurality of first to fourth light-emitting elements ED1, ED2, ED3, and ED4 may be aligned in the second direction (y-axis direction) between the first and second electrodes RME1 and RME2.

The first to fifth contact electrodes CTE1, CTE2, CTE3, CTE4, and CTE5 of each of the first to third pixels SP1, SP2, and SP3 may be disposed in a fifth metal layer MTL5. The second insulating layer PAS2 may be disposed on the bank layer BNL, the first insulating layer PAS1, and the light-emitting elements ED. The bank layer BNL may define the emission area EMA of each of the first to third pixels SP1, SP2, and SP3. The third insulating layer PAS3 may cover the second insulating layer PAS2 and the first to fifth contact electrodes CTE1, CTE2, CTE3, CTE4, and CTE5. The second and third insulating layers PAS2 and PAS3 may insulate each of the first to fifth contact electrodes CTE1, CTE2, CTE3, CTE4, and CTE5.

A first contact electrode CTE1 of the first pixel SP1 may be disposed on the first electrode RME1 of the first pixel SP1, and may be connected to the first anode connection electrode ANE1 of the second metal layer MTL2 through the thirteenth contact hole CNT13. The first contact electrode CTE1 may be connected between the first anode connection electrode ANE1 and first ends of the plurality of first light-emitting elements ED1. The first contact electrode CTE1 may receive the driving current passing through the first transistor ST1. The first contact electrode CTE1 may supply the driving current to the plurality of first light-emitting elements ED1 of the first pixel SP1. The first contact electrode CTE1 may correspond to the anode electrode of the plurality of first light-emitting elements ED1, but the present disclosure is not limited thereto.

The second contact electrode CTE2 may be insulated from the first and second electrodes RME1 and RME2. A first portion of the second contact electrode CTE2 may be disposed on the second electrode RME2 of the first pixel SP1 and may be extended in the second direction (y-axis direction). The second portion of the second contact electrode CTE2 may be extended from the lower side of the first portion and may be disposed on the first electrode RME1 of the first pixel SP1.

The second contact electrode CTE2 may be connected between the second ends of the plurality of first light-emitting elements ED1 and the first ends of the plurality of second light-emitting elements ED2. The second contact electrode CNE2 may correspond to the third node N3 of FIG. 4. The second contact electrode CTE2 may correspond to the cathode electrode of the plurality of first light-emitting elements ED1, but the present disclosure is not limited thereto. The second contact electrode CTE2 may correspond to the anode electrode of the plurality of second light-emitting elements ED2, but the present disclosure is not limited thereto.

The third contact electrode CTE3 may be insulated from the first and second electrodes RME1 and RME2. A first portion of the third contact electrode CTE3 may be disposed on the second electrode RME2 of the first pixel SP1 and may be extended in the second direction (y-axis direction). The second portion of the third contact electrode CTE3 may be disposed on the first electrode RME1 of the first pixel SP1 and may be disposed on the right side of the first pixel SP1.

The third contact electrode CTE3 may be connected between the second ends of the plurality of second light-emitting elements ED2 and the first ends of the plurality of third light-emitting elements ED3. The third contact electrode CTE3 may correspond to the fourth node N4 of FIG. 4. The third contact electrode CTE3 may correspond to the cathode electrode of the plurality of second light-emitting elements ED2, but the present disclosure is not limited thereto. The third contact electrode CTE3 may correspond to the anode electrode of the plurality of third light-emitting elements ED3, but the present disclosure is not limited thereto.

The fourth contact electrode CTE4 may be insulated from the first and second electrodes RME1 and RME2. A first portion of the fourth contact electrode CTE4 may be disposed on the second electrode RME2 of the second pixel SP2 and may be extended in the second direction (y-axis direction). The second portion of the fourth contact electrode CTE4 may be extended from the upper side of the first portion and may be disposed on the first electrode RME1 of the first pixel SP1.

The fourth contact electrode CTE4 may be connected between the second ends of the plurality of third light-emitting elements ED3 and the first ends of the plurality of fourth light-emitting elements ED4. The fourth contact electrode CTE4 may correspond to the fifth node N5 of FIG. 4. The fourth contact electrode CTE4 may correspond to the cathode electrode of the plurality of third light-emitting elements ED3, but the present disclosure is not limited thereto. The fourth contact electrode CTE4 may correspond to the anode electrode of the plurality of fourth light-emitting elements ED4, but the present disclosure is not limited thereto.

A fifth contact electrode CTE5 may be connected between the second ends of the plurality of fourth light-emitting elements ED4 and the second voltage line VSL. The fifth contact electrode CTE5 may be disposed on the second electrode RME2 of the second pixel SP2 and may be extended in the second direction (y-axis direction). The fifth contact electrode CTE5 may correspond to the cathode electrode of the plurality of fourth light-emitting elements ED4, but the present disclosure is not limited thereto. The fifth contact electrode CTE5 may receive a low-level voltage through the second electrode RME2.

A first contact electrode CTE1 of the second pixel SP2 may be disposed on the first electrode RME1 of the second pixel SP2, and may be connected to the second anode connection electrode ANE2 of the second metal layer MTL2 through the twenty-fifth contact hole CNT25. The first contact electrode CTE1 may be connected between the second anode connection electrode ANE2 and first ends of the plurality of first light-emitting elements ED1. The first contact electrode CTE1 may receive the driving current passing through the first transistor ST1. The first contact electrode CTE1 may supply the driving current to the plurality of first light-emitting elements ED1 of the second pixel SP2.

A first contact electrode CTE1 of the third pixel SP3 may be disposed on the first electrode RME1 of the third pixel SP3, and may be connected to the third anode connection electrode ANE3 of the second metal layer MTL2 through the thirty-sixth contact hole CNT36. The first contact electrode CTE1 may be connected between the third anode connection electrode ANE3 and first ends of the plurality of first light-emitting elements ED1. The first contact electrode CTE1 may receive the driving current passing through the first transistor ST1. The first contact electrode CTE1 may supply the driving current to the plurality of first light-emitting elements ED1 of the third pixel SP3.

What is claimed is:

1. A display device comprising:
a substrate;
a first voltage line in a first metal layer on the substrate;
a plurality of pixels, each of the plurality of pixels comprising:
a first transistor comprising: a drain electrode in an active layer on the first metal layer and electrically connected to the first voltage line, an active region adjacent to the drain electrode, a source electrode adjacent to the active region, and a gate electrode in a second metal layer on the active layer; and
a single first capacitor comprising: a first capacitor electrode integrally formed with the gate electrode of the first transistor and having a closed-loop shape, and a second capacitor electrode in the first metal layer and overlapping with the first capacitor electrode,
wherein the first capacitor electrode is completely spaced from the second capacitor electrode in a thickness direction of the substrate,
wherein the first capacitor electrode surrounds a first contact hole, and
wherein the first transistor is connected to a first connection electrode of the display device through the first contact hole.

2. A display device comprising:
a substrate;
a first voltage line in a first metal layer on the substrate;
a first transistor comprising: a drain electrode in an active layer on the first metal layer and electrically connected to the first voltage line, an active region adjacent to the drain electrode, a source electrode adjacent to the active region, and a gate electrode in a second metal layer on the active layer;
a first capacitor comprising: a first capacitor electrode integrally formed with the gate electrode of the first transistor and having a closed-loop shape, and a second capacitor electrode in the first metal layer and overlapping with the first capacitor electrode; and
a first connection electrode,
wherein the first connection electrode is in a third metal layer on the second metal layer, the first connection electrode is connected to the source electrode of the first transistor through a first contact hole, and the first connection electrode is connected to the second capacitor electrode through a second contact hole.

3. The display device of claim 2, wherein the first capacitor electrode surrounds the first contact hole.

4. The display device of claim 2, further comprising:
a first data line in the first metal layer; and
a second transistor comprising: a drain electrode in the active layer and electrically connected to the first data line, an active region adjacent to the drain electrode, a source electrode adjacent to the active region, and a gate electrode in the second metal layer.

5. The display device of claim 4, further comprising: a second connection electrode, wherein the second connection electrode is in the third metal layer on the second metal layer, the second connection electrode is connected to the source electrode of the second transistor through a third contact hole, and the second connection electrode is connected to the first capacitor electrode through a fourth contact hole.

6. The display device of claim 5, wherein the second connection electrode is on the right in a first direction of the source electrode of the first transistor, and
wherein the first connection electrode is located in a second direction crossing the first direction of the second connection electrode.

7. The display device of claim 5, wherein the fourth contact hole is located between the source electrode of the first transistor and the third contact hole.

8. The display device of claim 5, wherein the fourth contact hole is located in a first direction of the source electrode of the first transistor, and the fourth contact hole is located in a second direction crossing the first direction of the third contact hole.

9. The display device of claim 5, wherein the first capacitor electrode comprises:

a first portion surrounding the first contact hole;

a second portion protruding from the first portion in a first direction; and a third portion protruding from the first portion in a second direction crossing the first direction, wherein the first portion and the third portion of the first capacitor electrode overlap the second capacitor electrode.

10. The display device of claim 9, wherein the second portion of the first capacitor electrode is connected to the second connection electrode through the fourth contact hole.

11. A display device comprising:

a first data line, a second data line, and a third data line extending in parallel on a substrate;

a pixel circuit of a first pixel configured to receive a data voltage from the first data line;

a pixel circuit of a second pixel configured to receive a data voltage from the second data line;

a pixel circuit of a third pixel configured to receive a data voltage from the third data line and located between the pixel circuit of the first pixel and the pixel circuit of the second pixel; and a light-emitting element of the third pixel configured to receive a driving current from the pixel circuit of the third pixel, wherein the pixel circuit of the third pixel comprises:

a first transistor connected between a first voltage line and the light-emitting element of the third pixel;

a first connection electrode electrically connecting a source electrode of the first transistor with the light-emitting element of the third pixel;

a first capacitor comprising: a first capacitor electrode integrally formed with a gate electrode of the first transistor and a second capacitor electrode connected to the first connection electrode;

a second transistor electrically connecting the third data line with the first capacitor electrode; and a second connection electrode electrically connecting the first capacitor electrode with a source electrode of the second transistor, wherein the second connection electrode is connected to the source electrode of the second transistor through a first contact hole, wherein the first capacitor electrode surrounds only three sides of the first contact hole, wherein the first connection electrode is between the pixel circuit of the first pixel and the second connection electrode, and the first connection electrode is between the pixel circuit of the second pixel and the second connection electrode, and wherein a first capacitor electrode of the second pixel has a shape in which a third side opposite to a second side is open.

12. The display device of claim 11, wherein the second transistor of the third pixel is on a first side of the second connection electrode, and wherein the first connection electrode surrounds the second connection electrode except for the first side of the second connection electrode.

13. The display device of claim 12, further comprising:

a light-emitting element of the first pixel configured to receive a driving current from the pixel circuit of the first pixel, wherein the pixel circuit of the first pixel comprises:

a first transistor connected between the first voltage line and the light-emitting element of the first pixel;

a third connection electrode electrically connecting the source electrode of the first transistor with the light-emitting element of the first pixel;

a first capacitor comprising: a first capacitor electrode integrally formed with the gate electrode of the first transistor and a second capacitor electrode connected to the third connection electrode;

a second transistor electrically connecting the first data line with the first capacitor electrode; and a fourth connection electrode electrically connecting the first capacitor electrode with the source electrode of the second transistor.

14. The display device of claim 13, wherein the first capacitor electrode of the third pixel has a closed-loop shape, and wherein the first capacitor electrode of the first pixel has a shape in which a second side different from the first side is open.

15. The display device of claim 13, wherein the first capacitor of the first pixel is located between the fourth connection electrode and the pixel circuit of the third pixel.

16. The display device of claim 13, further comprising:

a light-emitting element of the second pixel configured to receive a driving current from the pixel circuit of the second pixel, wherein the pixel circuit of the second pixel comprises:

a first transistor connected between the first voltage line and the light-emitting element of the second pixel;

a fifth connection electrode electrically connecting the source electrode of the first transistor with the light-emitting element of the second pixel;

a first capacitor comprising: the first capacitor electrode that is integrally formed with the gate electrode of the first transistor and a second capacitor electrode connected to the fifth connection electrode;

a second transistor electrically connecting the second data line with the first capacitor electrode; and a sixth connection electrode electrically connecting the first capacitor electrode with the source electrode of the second transistor.

17. The display device of claim 16, wherein the first capacitor electrode of the third pixel has a closed-loop shape, and wherein the first capacitor electrode of the first pixel has a shape in which a second side different from the first side is open.

18. The display device of claim 11, wherein the first capacitor electrode of the third pixel has a closed-loop shape, and the second connection electrode overlaps with a part of the closed-loop shape.

19. The display device of claim 11, wherein the first capacitor electrode of the third pixel comprises:

a first portion having a closed-loop shape;

a second portion protruding from a first side of the first portion; and a third portion protruding from a second side different from the first side of the first portion, and wherein the first portion and the third portion overlap with the second capacitor electrode of the third pixel.

20. The display device of claim 19, wherein the second connection electrode overlaps with the second portion of the first capacitor electrode of the third pixel.

* * * * *